(12) United States Patent
Meynet et al.

(10) Patent No.: US 10,938,268 B2
(45) Date of Patent: Mar. 2, 2021

(54) TUBULAR ELECTROMECHANICAL ACTUATOR AND HOME AUTOMATION EQUIPMENT INCLUDING SUCH AN ACTUATOR

(71) Applicant: SOMFY ACTIVITES SA, Cluses (FR)

(72) Inventors: Emilie Meynet, Cluses (FR); Claude Desbiolles, Eteaux (FR); Jérôme Besombes, La Roche sur Foron (FR); Pierre-André Gardic, Saint Sixt (FR)

(73) Assignee: SOMFY ACTIVITES SA, Cluses (FR)

( * ) Notice: Subject to any disclaimer, the term of this patent is extended or adjusted under 35 U.S.C. 154(b) by 0 days.

(21) Appl. No.: 16/754,271

(22) PCT Filed: Oct. 9, 2018

(86) PCT No.: PCT/EP2018/077461
§ 371 (c)(1),
(2) Date: Apr. 7, 2020

(87) PCT Pub. No.: WO2019/072837
PCT Pub. Date: Apr. 18, 2019

(65) Prior Publication Data
US 2020/0303988 A1 Sep. 24, 2020

(30) Foreign Application Priority Data
Oct. 10, 2017 (FR) ...................... 1759469

(51) Int. Cl.
*H02K 5/22* (2006.01)
*H02K 11/26* (2016.01)
(Continued)

(52) U.S. Cl.
CPC ............. *H02K 5/225* (2013.01); *E06B 9/17* (2013.01); *E06B 9/42* (2013.01); *E06B 9/72* (2013.01);
(Continued)

(58) Field of Classification Search
CPC . H02K 5/22; H02K 7/06; H02K 11/30; H02K 11/26; H03K 5/24
(Continued)

(56) References Cited

U.S. PATENT DOCUMENTS

2008/0022597 A1  1/2008 Boischio
2009/0115366 A1* 5/2009 Mullet .................... E05F 15/41
                                                         318/466
(Continued)

FOREIGN PATENT DOCUMENTS

EP   2166189 A1 * 3/2010 ............. H02G 3/386
FR   2 983 368      5/2013

OTHER PUBLICATIONS

International Search Report, PCT/EP2018/077461, dated Jan. 30, 2019.
French Search Report, FR 1759469, dated May 31, 2018.

*Primary Examiner* — Jose A Gonzalez Quinones
(74) *Attorney, Agent, or Firm* — Nixon & Vanderhye

(57) ABSTRACT

A tubular electromechanical actuator includes an electronic control unit including a housing and an electronic board. A first electrical connection device includes first electrical connection elements configured to electrically connect the board to electrical connection elements of an electric motor and second electrical connection elements configured to electrically link the board to electrical connection elements of an additional electronic board of the motor. The first device is configured to plug into an edge of a printed circuit wafer of the board and to cooperate with the electric tracks of the board. In addition the first and second electrical connection elements are electrical connection elements that are configured to directly cooperate with the respective electrical connection elements of the motor and of the additional board.

20 Claims, 10 Drawing Sheets

(51) Int. Cl.
    *H02K 11/30*     (2016.01)
    *H02K 7/116*     (2006.01)
    *E06B 9/17*     (2006.01)
    *E06B 9/42*     (2006.01)
    *E06B 9/72*     (2006.01)
    *E06B 9/68*     (2006.01)

(52) U.S. Cl.
    CPC .............. *H02K 7/116* (2013.01); *H02K 11/26* (2016.01); *H02K 11/30* (2016.01); *E06B 2009/6809* (2013.01); *H02K 2207/03* (2013.01); *H02K 2211/03* (2013.01)

(58) Field of Classification Search
    USPC .......................... 310/71, 77, 75 R, 83, 96, 98
    See application file for complete search history.

(56) References Cited

U.S. PATENT DOCUMENTS

2015/0008801 A1*   1/2015   Schadlich .............. H02K 7/116
    310/68 B
2015/0364969 A1*  12/2015   Brondex ................... E06B 9/72
    160/310
2016/0376842 A1*  12/2016   Brondex ................... E06B 9/40
    160/7

* cited by examiner

TUBULAR ELECTROMECHANICAL ACTUATOR AND HOME AUTOMATION EQUIPMENT INCLUDING SUCH AN ACTUATOR

BACKGROUND OF THE INVENTION

Field of the Invention

The present invention relates to a tubular electromechanical actuator and a closure or sun protection home automation installation comprising such an actuator.

In general, the present invention relates to the field of concealing devices comprising a motorized driving device setting a screen in motion, between at least one first position and at least one second position.

Description of the Related Art

A motorized driving device comprises an electromechanical actuator for a movable element for closing, concealing or providing solar protection such as a shutter, door, gate, blind or any other equivalent material, hereinafter referred to as a screen.

Document FR2,983,368 A1 is already known, which describes a tubular electromechanical actuator for a closure or sun protection home automation installation.

The electromechanical actuator comprises an electric motor, a reduction gear, an electronic control unit, an electrical connection device, a casing and a closure element. The electronic control unit comprises a housing and electronic board. The electronic board is arranged inside the housing, in an assembled configuration of the electronic control unit. The electrical connection device is configured to electrically connect the electronic board of the electronic control unit to the electric motor, in an assembled configuration of the electromechanical actuator. The casing is hollow and configured to house the electronic control unit, the electric motor and the reduction gear. The closure element is configured to close off an end of the casing.

The housing of the electronic control unit comprises slugs, at a first end, that are configured to cooperate with notches arranged in the electric motor, in the assembled configuration of the electromechanical actuator.

The housing of the electronic control unit also comprises openings, at a second end opposite the first end, that are configured to cooperate with resiliently deformable tabs of the closure element, in the assembled configuration of the electromechanical actuator.

However, this electromechanical actuator has the drawback of electrically connecting the electronic board of the electronic control unit to the electric motor using an additional electronic board and a flexible strand of electrical cables. The additional electronic board is positioned inside an enclosure of the electric motor. A first end of the strand of electrical cables is electrically coupled to the additional electronic board of the electric motor. A second free end of the strand of electrical cables comprises an electrical connector configured to cooperate with an electrical connector of the electronic board of the electronic control unit.

Furthermore, the strand of electrical cables has the shortest possible length, so as to avoid contact with an active part of the electronic board of the electronic control unit.

Furthermore, the assembly of the electrical connector belonging to the strand of electrical cables with the electrical connector of the electronic board of the electronic control unit is implemented in a reduced bulk and is made partially blind.

As a result, the assembly of the electrical connector belonging to the strand of electrical cables with the electrical connector of the electronic board of the electronic control unit is not easy, during the manufacture of the electromechanical actuator.

Furthermore, such an assembly requires a certain dexterity by the manufacturing operators.

Furthermore, such an assembly can create risks in terms of the quality of the electromechanical actuator, since the pushing in of the electrical connector belonging to the strand of electrical cables relative to the electrical connector of the electronic board of the electronic control unit is not guaranteed, during the manufacturing of the electromechanical actuator.

Furthermore, such an assembly can create risks in terms of the quality of the electromechanical actuator, since the electrical connector belonging to the strand of electrical cables can be damaged, during the transport and handling of the strand of electrical cables.

As a result, the cost of obtaining the electromechanical actuator is high.

SUMMARY OF THE INVENTION

The present invention aims to resolve the aforementioned drawbacks and to propose a tubular electromechanical actuator, as well as a closure or sun protection home automation installation comprising such an actuator, making it possible to simplify manufacture of the electromechanical actuator, while minimizing the costs of obtaining the electromechanical actuator and eliminating manufacturing flaws of the electromechanical actuator.

To that end, according to a first aspect, the present invention relates to a tubular electromechanical actuator for a closure or sun protection home automation installation, the electromechanical actuator comprising at least:
  an electric motor,
  a reduction gear,
  an electronic control unit, the electronic control unit comprising a housing and an electronic board, the electronic board being arranged inside the housing, in an assembled configuration of the electronic control unit,
  a first electrical connection device, the first electrical connection device being configured to electrically connect the electronic board of the electronic control unit to the electric motor, in an assembled configuration of the electromechanical actuator, and
  a casing, the casing being hollow and configured to house at least the electronic control unit, the electric motor and the reduction gear.

According to the invention, the first electrical connection device comprises at least:
  first electrical connection elements configured to electrically connect the electronic board of the electronic control unit to electrical connection elements of the electric motor, in the assembled configuration of the electromechanical actuator, and
  second electrical connection elements configured to electrically connect the electronic board of the electronic control unit to electrical connection elements of an additional electronic board of the electric motor, in the assembled configuration of the electromechanical actuator.

The first electrical connection device is configured, on the one hand, to plug onto an edge of a printed circuit board of the electronic board of the electronic control unit and, on the other hand, to cooperate with electric tracks of the electronic board of the electronic control unit.

Furthermore, the first and second electrical connection elements of the first electrical connection device are electrical connection elements configured to cooperate directly with the respective electrical connection elements of the electric motor and of the additional electronic board of the electric motor.

Thus, the first electrical connection device makes it possible to produce an electrical connection from the electronic board of the electronic control unit, on the one hand, toward the electric motor and, on the other hand, toward the additional electronic board of the electric motor, without using flexible electrical cables.

In this way, such an assembly of the electronic board of the electronic control unit with the electric motor using the first electrical connection device is simplified, while minimizing the costs of obtaining the electromechanical actuator and eliminating manufacturing flaws of the electromechanical actuator.

According to a first embodiment, the first electrical connection device comprises a single housing. Furthermore, the housing includes at least the first and second electrical connection elements of the first electrical connection device.

According to a second embodiment, the first electrical connection device comprises a first housing and a second housing. The second housing is configured to be assembled on the first housing. The first housing includes at least the first electrical connection elements of the first electrical connection device. Furthermore, the second housing includes at least the second electrical connection elements of the first electrical connection device.

According to one preferred feature of the invention, the first electrical connection device also comprises a third electrical connection element configured to electrically connect the electronic board of the electronic control unit to the casing of the electromechanical actuator.

According to one advantageous feature of the invention, the third electrical connection element of the first electrical connection device is configured to produce an electrical connection between the casing of the electromechanical actuator and the electronic board of the electronic control unit, so as to discharge electrostatic charges using an electrostatic charge discharging device.

According to another advantageous feature of the invention, the casing of the electromechanical actuator is made from an electrically conductive material.

According to another advantageous feature of the invention, the electromechanical actuator comprises a second electrical connection device configured to electrically connect the electronic board of the electronic control unit to an electrical power cable, in the assembled configuration of the electromechanical actuator.

According to another advantageous feature of the invention, the electromechanical actuator also comprises a closure element and an interface element. The closure element is configured to close off one end of the casing. The interface element is arranged between the closure element and the electronic control unit. Furthermore, the interface element is configured to cooperate, on the one hand, with the second electrical connection device and, on the other hand, with the electrical power cable.

According to a second aspect, the invention relates to a home automation installation for closing or sun protection that comprises a screen able to be wound on a winding tube rotated by a tubular electromechanical actuator according to the invention.

This home automation installation has features and advantages similar to those previously described relative to the tubular electromechanical actuator described above.

BRIEF DESCRIPTION OF THE DRAWINGS

Other particularities and advantages of the invention will also appear in the description below, done in reference to the appended drawings, provided as non-limiting examples.

DESCRIPTION OF THE PREFERRED EMBODIMENTS

Figure 1:
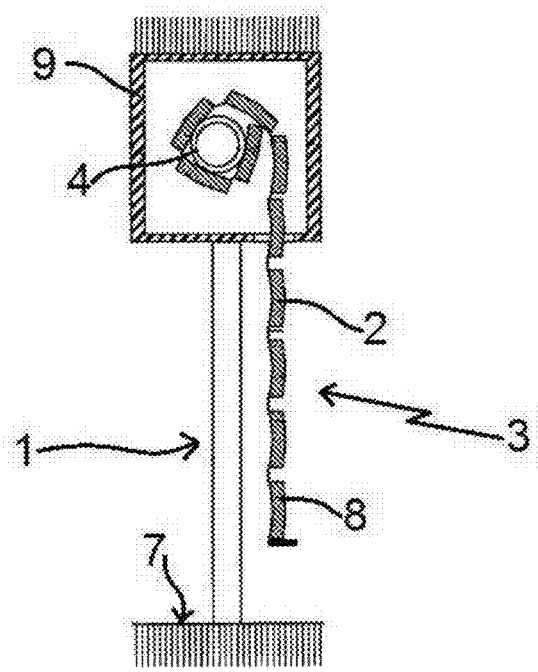
FIG. 1 is a cross-sectional schematic view of a home automation installation according to one embodiment of the invention.
Figure 2:
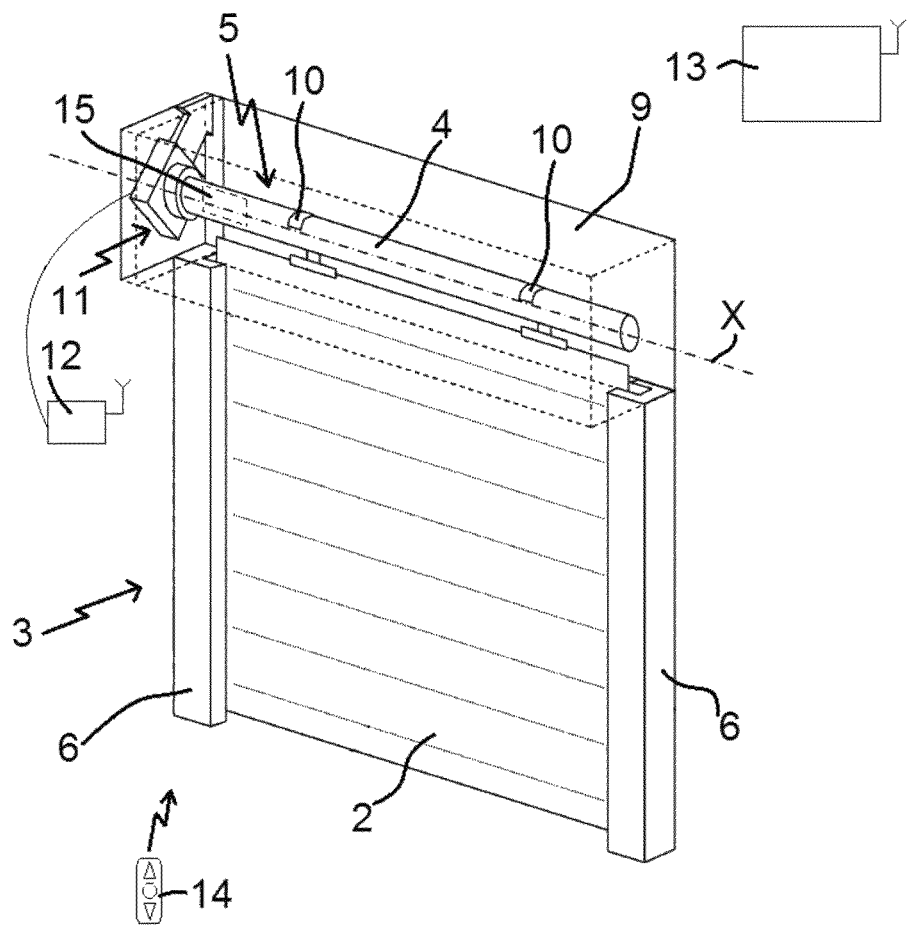
FIG. 2 is a perspective schematic view of the home automation installation illustrated in FIG. 1.

In reference to FIGS. 1 and 2, we first describe a home automation installation according to the invention and installed in a building comprising an opening 1, window or door, equipped with a screen 2 belonging to a concealing device 3, in particular a motorized rolling shutter.

The concealing device 3 can be a rolling shutter, a canvas blind or a blind with adjustable slats, or a rolling gate. The present invention applies to all types of concealing devices.

A rolling shutter according to one embodiment of the invention is described in reference to FIGS. 1 and 2.

The screen 2 of the concealing device 3 is wound on a winding tube 4 driven by a motorized driving device 5 and movable between a wound position, in particular an upper position, and an unwound position, in particular a lower position.

The moving screen 2 of the concealing device 3 is a closure, concealing and/or sun protection screen, winding on the winding tube 4, the inner diameter of which is generally greater than the outer diameter of an electromechanical actuator 11, such that the electromechanical actuator 11 can be inserted into the winding tube 4, during the assembly of the concealing device 3.

The motorized driving device 5 comprises the electromechanical actuator 11, in particular of the tubular type, making it possible to set the winding tube 4 in rotation, so as to unwind or wind the screen 2 of the concealing device 3.

The concealing device 3 comprises the winding tube 4 for winding the screen 2. In the mounted state, the electromechanical actuator 11 is inserted into the winding tube 4.

In a known manner, the rolling shutter, which forms the concealing device 3, comprises an apron comprising horizontal slats articulated on one another, forming the screen 2 of the rolling shutter 3, and guided by two lateral guideways 6. These slats are joined when the apron 2 of the rolling shutter 3 reaches its unwound lower position.

In the case of a rolling shutter, the wound upper position corresponds to the bearing of a final end slat 8, for example L-shaped, of the apron 2 of the rolling shutter 3 against an edge of a box 9 of the rolling shutter 3, and the unwound lower position corresponds to the bearing of the final end slat 8 of the apron 2 of the rolling shutter 3 against a threshold 7 of the opening 1.

The first slat of the apron 2 of the rolling shutter 3, opposite the final end slat 8, is connected to the winding tube 4 using at least one articulation 10, in particular a fastener in strip form.

The winding tube 4 is positioned inside the box 9 of the rolling shutter 3. The apron 2 of the rolling shutter 3 winds and unwinds around the winding tube 4 and is housed at least partially inside the box 9.

In general, the box 9 is positioned above the opening 1, or in the upper part of the opening 1.

The motorized driving device 5 is controlled by a control unit. The control unit may, for example, be a local control unit 12, where the local control unit 12 can be connected through a wired or wireless connection with a central control unit 13. The central control unit 13 drives the local control unit 12, as well as other similar local control units distributed throughout the building.

The central control unit 13 can be in communication with a weather station located outside the building, in particular including one or more sensors that can be configured, for example, to determine a temperature, a brightness, or a wind speed.

A remote control 14, which can be a type of local control unit, and provided with a control keypad, which comprises selection and display elements, further allows a user to intervene on the electromechanical actuator 11 and/or the central control unit 13.

The motorized driving device 5 is, preferably, configured to carry out the unwinding or winding commands of the screen 2 of the concealing device 3, which may, in particular, be acquired by the remote control 14.

Figure 3:
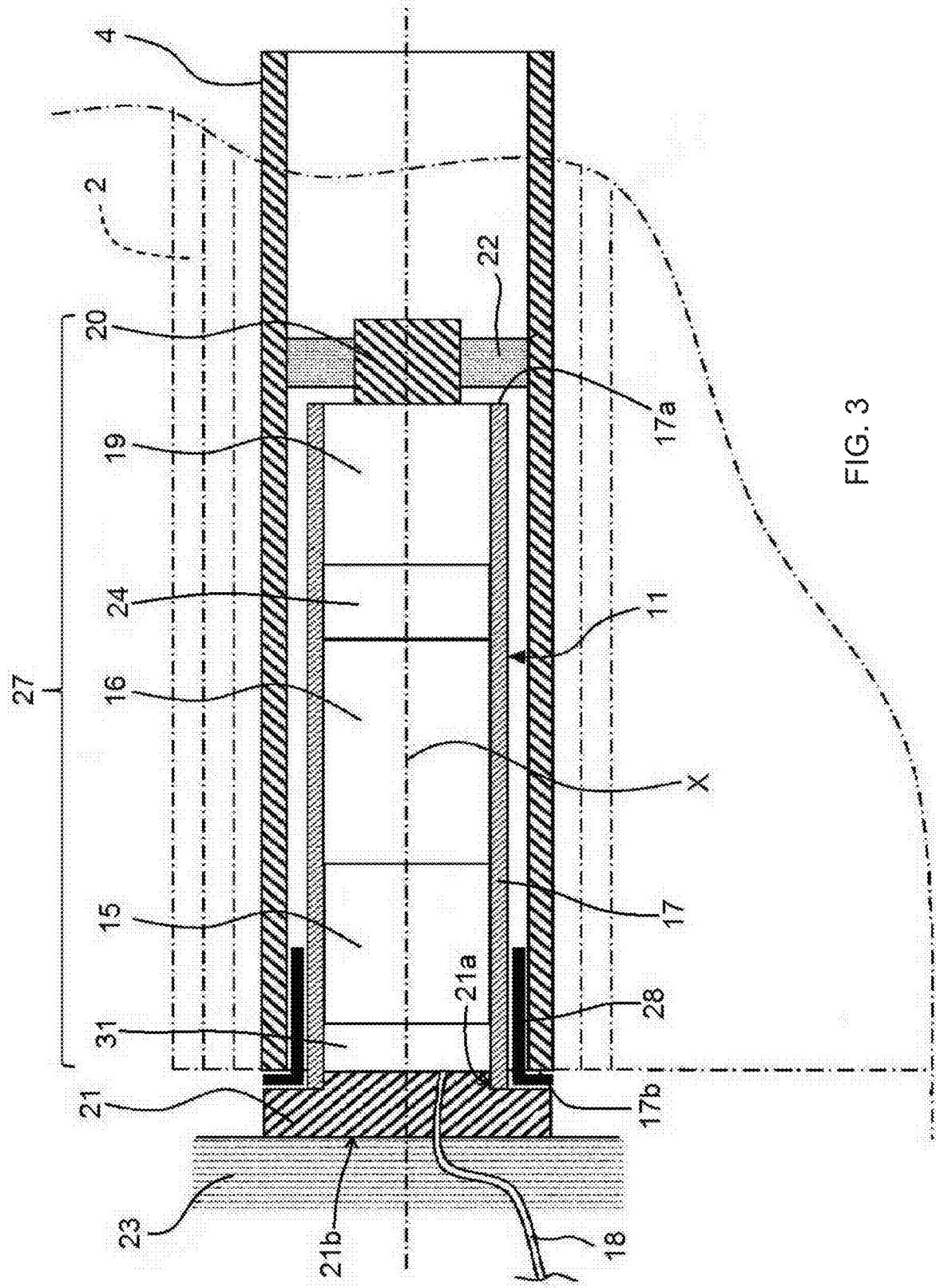
FIG. 3 is a partial and axial sectional schematic view of the home automation installation illustrated in FIGS. 1 and 2, showing a tubular electromechanical actuator of the installation.
Figure 4:
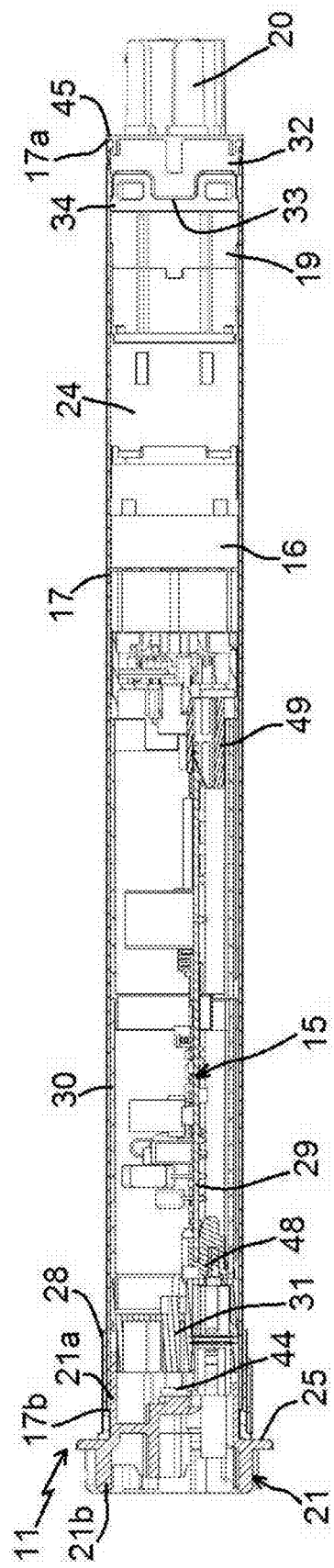
FIG. 4 is a sectional schematic view of the electromechanical actuator illustrated in FIG. 3, in an offset section plane relative to a longitudinal axis of the actuator.
Figure 5:
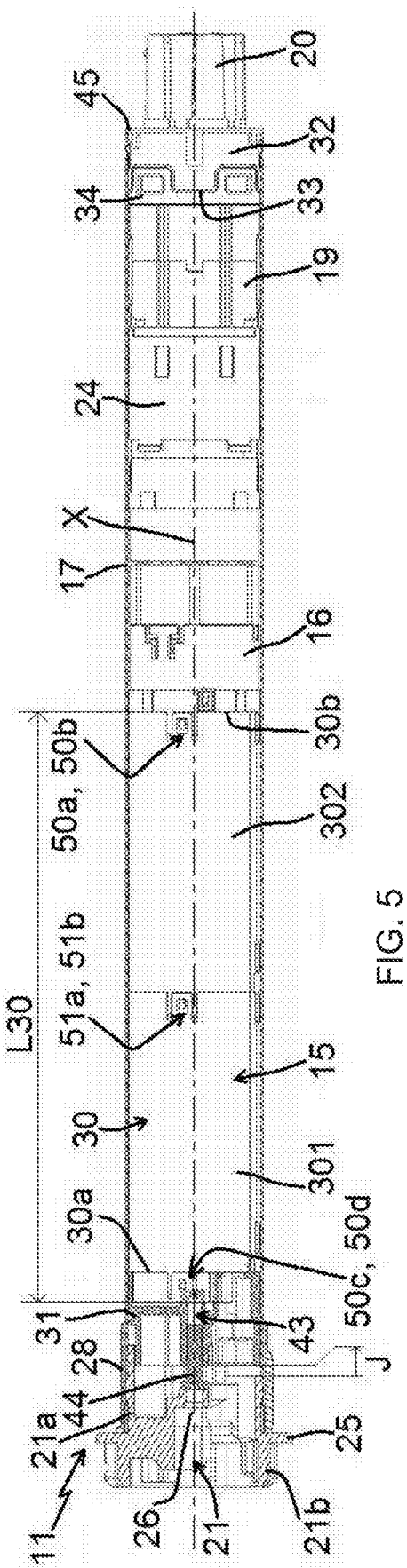
FIG. 5 is a partial sectional schematic view of the electromechanical actuator illustrated in FIG. 3, in a section plane passing through the longitudinal axis of the actuator.

The electromechanical actuator 11 belonging to the home automation installation of FIGS. 1 and 2 is now described in reference to FIGS. 3 to 5.

The electromechanical actuator 11 comprises an electronic control unit 15, an electric motor 16 and a reduction gear 19.

The electromechanical actuator 11 also comprises an output shaft 20.

Figure 16:
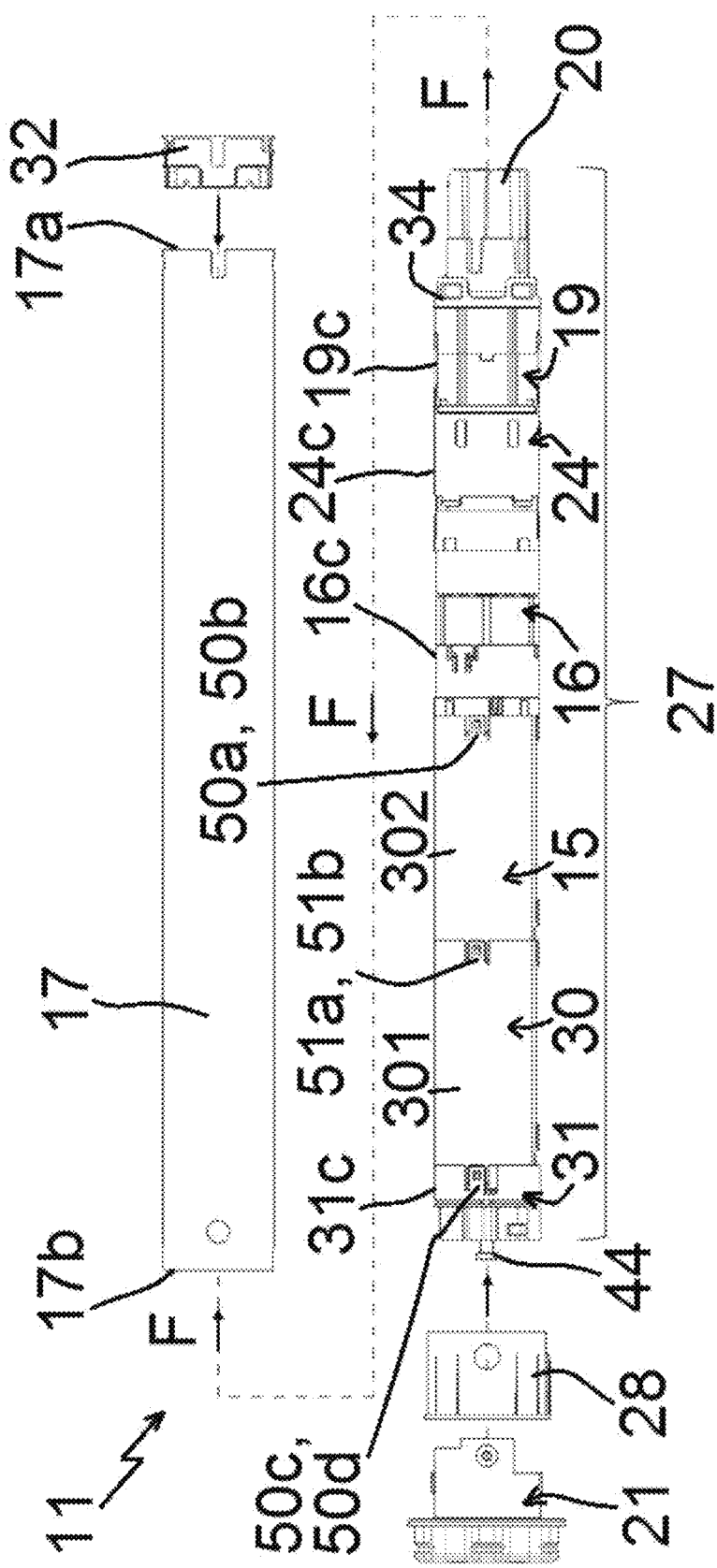
FIG. 16 is a schematic view of the electromechanical actuator illustrated in FIGS. 4 and 5, representative of an assembly method of this actuator.

Here, the electronic control unit 15, the electric motor 16, the reduction gear 19 and the output shaft 20 form an assembly 27, as illustrated in FIGS. 3 and 16.

Thus, the assembly 27 is formed by members of the electromechanical actuator 11, of which the electronic control unit 15, the electric motor 16, the reduction gear 19 and the output shaft 20 are an integral part.

The electric motor 16 comprises a rotor and a stator, not shown, which are positioned coaxially around a rotation axis X, which is also the rotation axis of the winding tube 4 in the assembled configuration of the motorized driving device 5.

Here, the reduction gear 19 is of the type with gear pairs.

In practice, the electric motor 16 comprises an output shaft, not shown, configured to cooperate with an input shaft, not shown, of the reduction gear 19, in an assembled configuration of the electromechanical actuator 11.

Control means for controlling the electromechanical actuator 11, making it possible to move the screen 2 of the concealing device 3, comprise at least the electronic control unit 15. This electronic control unit 15 is able to operate the electric motor 16 of the electromechanical actuator 11 and, in particular, to allow the supply of electricity for the electric motor 16.

Thus, the electronic control unit 15, in particular, controls the electric motor 16, so as to open or close the screen 2, as previously described.

The electronic control unit 15 also comprises an order receiving module, in particular for wireless orders sent by an order transmitter, such as the remote control 14 designed to control the electromechanical actuator 11 or one of the local 12 or central 13 control units.

The order receiving module can also allow the reception of orders sent by wired means.

The control means of the electromechanical actuator 11 comprise hardware and/or software means.

As a non-limiting example, the hardware means may comprise at least one microcontroller.

The electromechanical actuator 11 also comprises a casing 17, which is, in particular, tubular.

The casing 17 of the electromechanical actuator 11 is, preferably, in cylindrical shape and, more specifically, has a circular section.

The casing 17 is hollow and configured to house the electronic control unit 15, the electric motor 16 and the reduction gear 19. Furthermore, the casing 17 can, optionally, be configured to house part of the output shaft 20.

The casing 17 comprises a first end 17a and a second end 17b. The second end 17b is opposite the first end 17a.

The output shaft 20 of the electromechanical actuator 11 protrudes past the casing 17 at the first end 17a of the casing 17, in the assembled configuration of the electromechanical actuator 11.

Thus, the output shaft 20 of the electromechanical actuator 11 is positioned inside the winding tube 4 and at least partially outside the casing 17 of the electromechanical actuator 11.

Advantageously, the output shaft 20 of the electromechanical actuator 11 is coupled, by a connecting element 22, to the winding tube 4, in particular using a wheel-shaped connecting element.

The electromechanical actuator 11 is supplied with electricity by an electricity grid of the sector, or using a battery, which can, for example, be recharged by a photovoltaic panel. The electromechanical actuator 11 makes it possible to move the screen 2 of the concealing device 3.

Here, the electromechanical actuator 11 comprises an electrical power cable 18 allowing it to be supplied with electricity from the electricity grid of the sector.

Advantageously, the electromechanical actuator 11 also comprises a brake 24.

Here, the brake 24 of the electromechanical actuator 11 is an integral part of the assembly 27.

As a non-limiting example, the brake 24 may be a spring-loaded brake, a cam brake or an electromagnetic brake.

Advantageously, the electromechanical actuator 11 may also comprise an end-of-travel and/or obstacle detection device, which may be mechanical or electronic.

The electromechanical actuator 11 also comprises a closure element 21 for the second end 17b of the casing 17.

The closure element 21 protrudes past the casing 17 at the second end 17b of the casing 17, in the assembled configuration of the electromechanical actuator 11.

In practice, the closure element 21 is positioned at an end of the electromechanical actuator 11 opposite that at which the output shaft 20 protrudes from the casing 17.

Here, the casing 17 of the electromechanical actuator 11 is fastened to a support 23, in particular a flange, of the box 9 of the concealing device 3 using the closure element 21 forming a torque pin, in particular a closure and torque-reacting head. In such a case where the closure element 21 forms a torque pin, the closure element 21 is also called a fixed point of the electromechanical actuator 11.

Advantageously, the closure element 21 is made from plastic and, more specifically, by molding.

In the exemplary embodiment illustrated in FIGS. 3 to 6 and 15 to 16, the closure element 21 is made in a single piece, in particular of the monobloc type.

Here, the closure element 21 is a revolving part.

The closure element 21 comprises a first part 21a configured to cooperate with the casing 17 of the electromechanical actuator 11 and a second part 21b configured to cooperate with the support 23.

At least the first part 21a of the closure element 21 is generally cylindrical and is arranged inside the casing 17 of the electromechanical actuator 11, in the assembled configuration of the electromechanical actuator 11.

Advantageously, the closure element 21 comprises a stop 25 configured to cooperate with the casing 17, at the second end 17b of the casing 17, in the assembled configuration of the electromechanical actuator 11, in particular via a crown 28.

Thus, the stop 25 of the closure element 21 makes it possible to limit the pushing in of the first part 21a of the closure element 21 in the casing 17.

Furthermore, the stop 25 of the closure element 21 delimits the first and second parts 21a, 21b of the closure element 21.

Thus, only the first part 21a of the closure element 21 is arranged inside the casing 17 of the electromechanical actuator 11, following the fitting of the closure element 21 inside the casing 17, up to the stop 25.

Here, the stop 25 of the closure element 21 is made in the form of a flange ring, in particular with a cylindrical and planar shape.

In a variant, not shown, the closure element 21 comprises at least two parts. The first part of the closure element 21 comprises the first part 21a of the closure element 21 configured to cooperate with the casing 17 of the electromechanical actuator 11. The second part of the closure element 21 comprises the second part 21b of the closure element 21 configured to cooperate with the support 23.

Advantageously, the motorized drive device 5 comprises the crown 28. The crown 28 is arranged around the casing 17 of the electromechanical actuator 11 and at the second end 17b of the casing 17.

Here, the winding tube 4 is rotated about the rotation axis X and the casing 17 of the electromechanical actuator 11 supported by two pivot links. The first pivot link is produced at a first end of the winding tube 4 using the crown 28. The crown 28 thus makes it possible to produce a bearing. The second pivot link, not shown, is produced at a second end of the winding tube 4.

The electromechanical actuator 11 also comprises an interface element 31, as illustrated in FIGS. 4 to 8 and 15 to 16. The interface element 31 is arranged between the closure element 21 and, more specifically, the first part 21a of the closure element 21, and the electronic control unit 15, along the direction of the rotation axis X.

Here, the interface element 31 of the electromechanical actuator 11 is an integral part of the assembly 27.

Here, and as illustrated in FIGS. 4 and 5, the electronic control unit 15, the electric motor 16, the reduction gear 19, the interface element 31 and the brake 24 are positioned inside the casing 17 of the electromechanical actuator 11.

Preferably, the members 31, 15, 16, 19, 24, 20 of the assembly 27 are assembled to one another in a predetermined order. The predetermined assembly order of the members 31, 15, 16, 19, 24, 20 of the assembly 27 first comprises the assembly of the interface element 31 with the electronic control unit 15, then the assembly of the electronic control unit 15 with the electric motor 16, then the assembly of the electric motor 16 with the reduction gear 19 and the assembly of the reduction gear 19 with the output shaft 20.

In the exemplary embodiment illustrated in FIGS. 3 to 5 and 16, the brake 24 is positioned between the electric motor 16 and the reduction gear 19.

In a variant, not shown, the brake 24 is positioned between the reduction gear 19 and the output shaft 20.

Here, each member 31, 15, 16, 19, 24, 20 of the assembly 27 has an axis that is combined with the rotation axis X, in the assembled configuration of the electromechanical actuator 11. The axis of each of the members 15, 16, 19, 24, 20 of the assembly 27 is not shown in FIGS. 3 to 16, so as to simplify the reading thereof.

The electronic control unit 15 belonging to the electromechanical actuator 11 of FIGS. 3 to 5 is now described in more detail and in reference to FIGS. 7 to 13.

The electronic control unit 15 comprises a housing 30 and an electronic board 29. The electronic board 29 is positioned inside the housing 30, in an assembled configuration of the electronic control unit 15.

Thus, the housing 30 of the electronic control unit 15 makes it possible to protect the electronic board 29, during the assembly of the electromechanical actuator 11 and following the assembly of the latter, as well as to ensure the rigidity of the assembly 27.

Furthermore, the housing 30 of the electronic control unit 15 makes it possible to electrically insulate the electronic board 29 relative to the casing 17.

Preferably, the outer diameter of the housing 30 of the electronic control unit 15 is smaller than the inner diameter of the casing 17 of the electromechanical actuator 11, such that the housing 30 can be inserted into the casing 17 of the electromechanical actuator 11, during the assembly of the electromechanical actuator 11.

Advantageously, the housing 30 of the electronic control unit 15 comprises at least one section 301, 302 made in the form of a hollow tube.

Thus, obtaining the housing 30 using said at least one section 301, 302, made in the form of a hollow tube makes it possible to guarantee the protection of the electronic board 29, during the assembly of the electronic control unit 15 to the inside of the casing 17 of the electromechanical actuator 11, in particular to avoid a deformation of the electronic board 29.

Each section 301, 302 of the housing 30 is, preferably, in cylindrical shape and, more specifically, has a circular section.

Here, the housing 30 of the electronic control unit 15 comprises a first section 301, made in the form of a first hollow tube, and a second section 302, made in the form of a second hollow tube. The sections 301, 302 are configured to house the electronic board 29 of the electronic control unit 15, in the assembled configuration of the electromechanical actuator 11.

Furthermore, the first section 301 of the housing 30 comprises first fastening elements 51a configured to cooperate with first fastening elements 51b of the second section 302 of the housing 30, in the assembled configuration of the electronic control unit 15.

Thus, obtaining the housing 30 using first and second sections 301, 302 made in the form of a hollow tube makes it possible to adapt the length L30 of the housing 30 as a function of the length L29 of the electronic board 29 using at least one of the first and second sections 301, 302, while eliminating manufacturing flaws. The lengths L29, L30 are measured parallel to the rotation axis X, in the assembled configuration of the electromechanical actuator 11.

Furthermore, the first fastening elements 51a, 51b of the first and second sections 301, 302 of the housing 30 make it possible to secure these first and second sections 301, 302 to one another in rotation and in translation.

Furthermore, the assembly of the first and second sections 301, 302 of the housing 30 of the electronic control unit 15 using first fastening elements 51a, 51b can be implemented automatically.

As a result, the cost of obtaining the housing 30 of the electronic control unit 15 is less expensive than a housing of an electronic control unit comprising two half-shells for which a manual assembly is necessary, like that disclosed in document FR2,983,368 A1. Preferably, the first fastening elements 51a, 51b of the first and second sections 301, 302 of the housing 30 are fastening elements by resilient snapping.

Here, the first fastening elements 51a, 51b by resilient snapping of the first and second sections 301, 302 of the housing 30 are made using tongues and slugs.

In reference to FIGS. 5 and 16, each tongue comprises an opening configured to cooperate with a slug.

Figure 7:
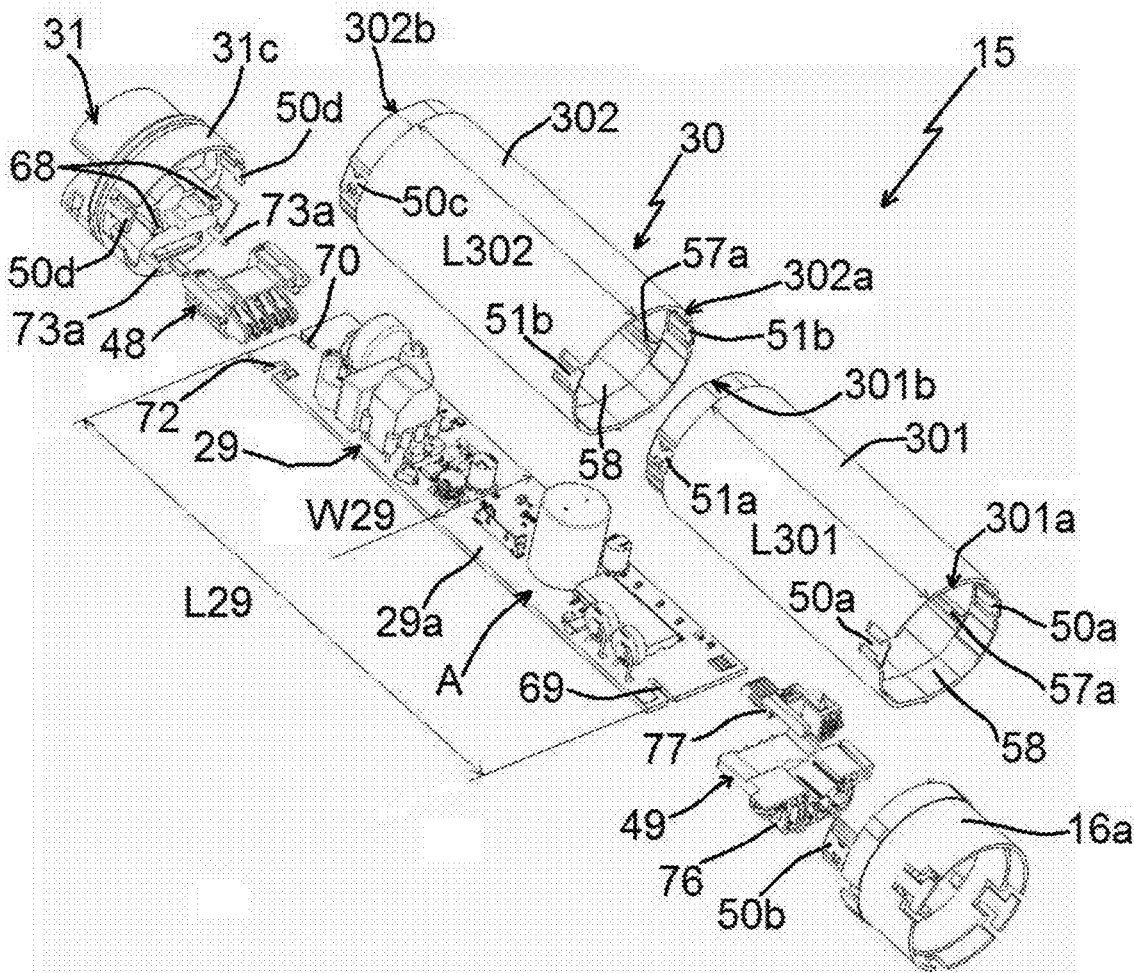
FIG. 7 is a first exploded and perspective schematic view of part of the electromechanical actuator illustrated in FIGS. 4 and 5, showing an electronic control unit, the interface element and a cover of an electric motor.
Figure 8:
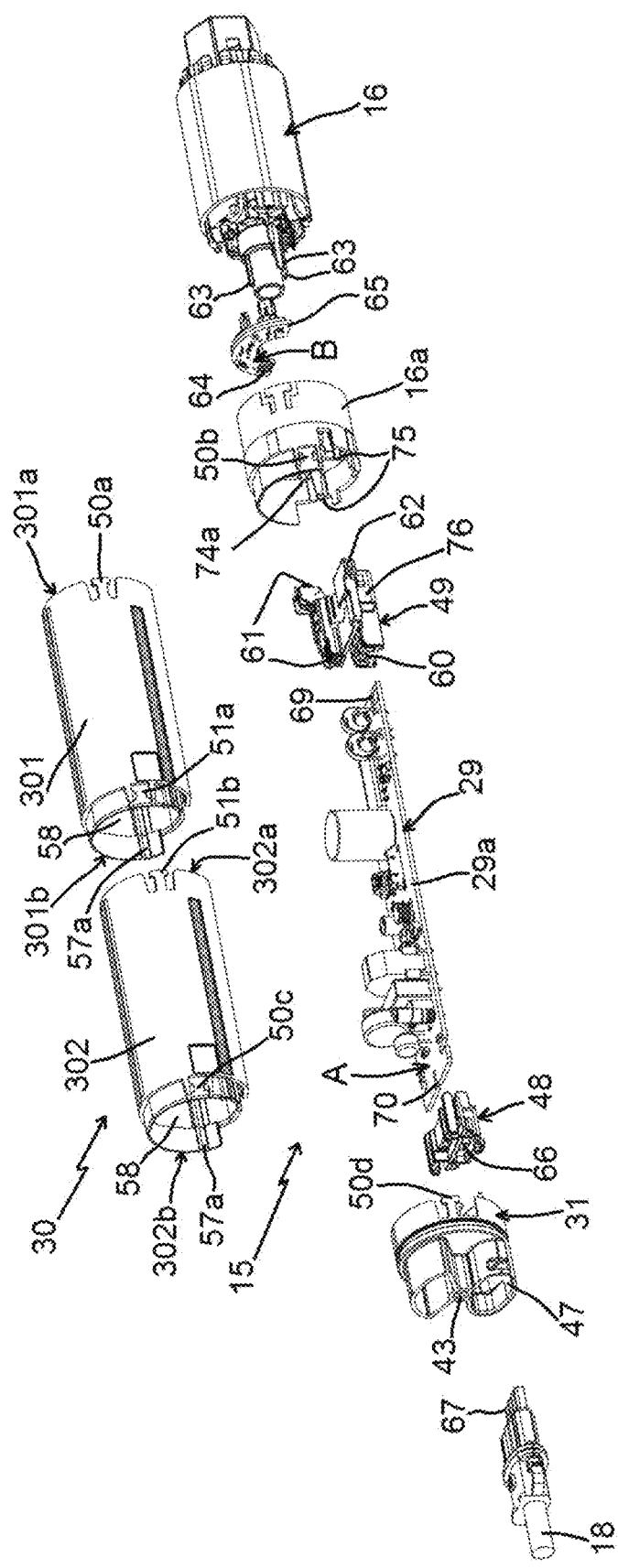
FIG. 8 is a second exploded and perspective schematic view of part of the electromechanical actuator illustrated in FIGS. 4 and 5, from another viewing angle, showing the electronic control unit, the interface element, an electric motor, the cover of the electric motor and an electrical power cable.
Figure 13:
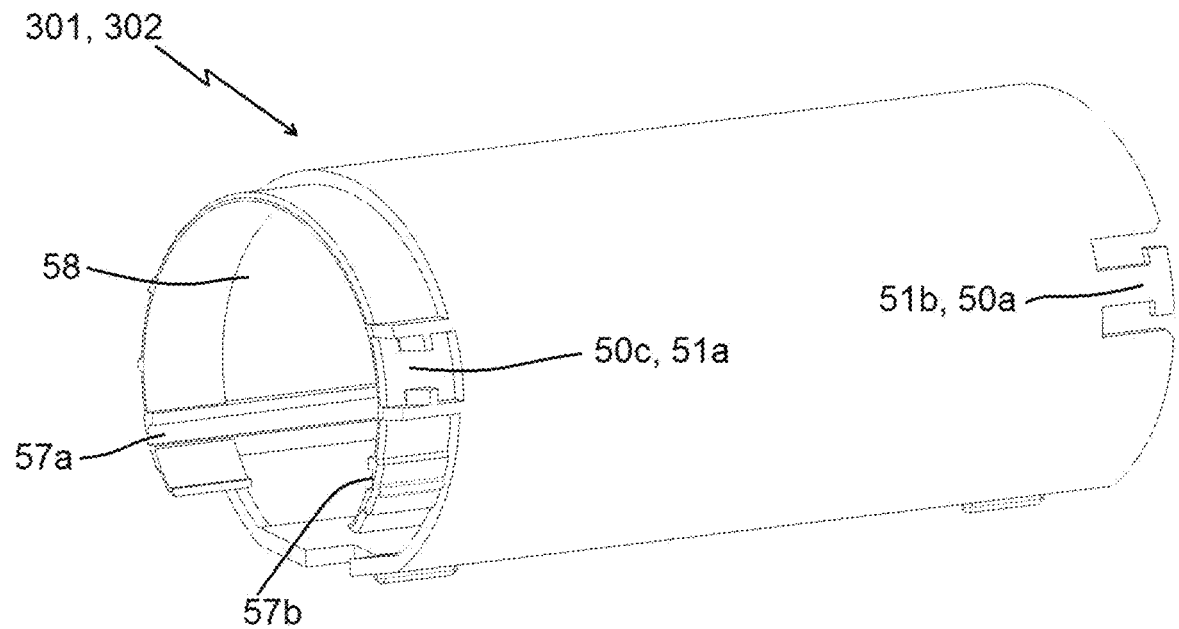
FIG. 13 is a perspective schematic view of a section of a housing of the electronic control unit illustrated in FIGS. 4 to 5, 7 and 8.

In a variant and as shown in FIGS. 7, 8 and 13, each tongue 51b is configured to cooperate with two slugs of a complementary fastening element 51a. Advantageously, the tongue 51b has a "T" shape. In other words, the tongue 51b comprises a first branch and a second branch that are coupled to one another. The second branch is positioned on either side of the first branch. Here, the second branch is perpendicular to the first branch. Furthermore, each slug is configured to be housed at a distinct angle formed by the first branch and the second branch of the tongue.

Here, the first section 301 of the housing 30 comprises a first end 301a configured to cooperate with the electric motor 16 and, in particular, a cover 16a of the electric motor 16. The first section 301 of the housing 30 also comprises a second end 301b, opposite the first end 301a, configured to cooperate with a first end 302a of the second section 302 of the housing 30. Furthermore, the second section 302 of the housing 30 comprises a second end 302b, opposite the first end 302a, configured to cooperate with the interface element 31.

Advantageously, the first section 301 of the housing 30 comprises second fastening elements 50a configured to cooperate with first fastening elements 50b of the electric motor 16, in the assembled configuration of the electromechanical actuator 11. Furthermore, the second section 302 of the housing 30 comprises second fastening elements 50c configured to cooperate with first fastening elements 50d of the interface element 31, in the assembled configuration of the electromechanical actuator 11.

Thus, the first and second sections 301, 302 of the housing 30 are assembled with the electric motor 16 and the interface element 31, in particular before the introduction of these elements 30, 16, 31 and, more specifically, of the assembly 27, inside the casing 17, so as to facilitate the handling and assembly operations of the electromechanical actuator 11.

Preferably, the second fastening elements 50a, 50c of the first and second sections 301, 302 of the housing 30 and the first fastening elements 50b, 50d of the electric motor 16 and of the interface element 31 are fastening elements by resilient snapping.

Here, the second fastening elements 50a, 50c of the first and second sections 301, 302 of the housing 30 and the first fastening elements 50b, 50d of the electric motor 16 and of the interface element 31 by resilient snapping are produced using tongues and slugs.

In reference to FIGS. 5 and 16, each tongue 50a, 50d comprises an opening configured to cooperate with a slug.

In a variant and as shown in FIGS. 7, 8 and 13, each tongue 50a, 50d is configured to cooperate with two slugs. Advantageously, the tongue 50a, 50d has a "T" shape. In other words, the tongue 50a, 50d comprises a first branch and a second branch that are coupled to one another. The second branch is positioned on either side of the first branch. Here, the second branch is perpendicular to the first branch. Furthermore, each slug is configured to be housed at a distinct angle formed by the first branch and the second branch of the tongue.

Preferably, the first and second sections 301, 302 of the housing 30 are made from a plastic material. Furthermore, the first and second sections 301, 302 of the housing 30 are obtained using a technique for injecting plastic material.

Thus, the manufacturing of the first and second sections 301, 302 of the housing 30, according to a technique for injecting plastic material, makes it possible to guarantee a high level of compliance of the first and second sections 301, 302 and to reduce the tolerance intervals of the dimensions associated with the first and second sections 301, 302, so as to improve the precision of the assembly of the electronic control unit 15, as well as the electromechanical actuator 11.

Furthermore, the manufacturing of the first and second sections 301, 302 of the housing 30, using a technique for injecting plastic material, makes it possible to incorporate the first and second fastening elements 50a, 51a, 51b, 50c to the first and second sections 301, 302.

Preferably, the first and second sections 301, 302 of the housing 30 respectively comprise the same first and second fastening elements 50a, 51a, 51b, 50c.

Thus, the first and second sections 301, 302 of the housing 30 are modular elements and can be inverted.

In this way, the first and second fastening elements 50a, 51a, 51b, 50c of each of the first and second sections 301, 302 of the housing 30 are identical.

Furthermore, at least one of the first and second sections 301, 302 of the housing 30 can be added or removed, during the assembly of the electronic control unit 15, so as to adapt the length L30 of the housing 30 of the electronic control unit 15 as a function of the length L29 of the electronic board 29.

Here, the first and second sections 301, 302 of the housing 30 are identical and have identical lengths L301, L302.

Thus, such a housing 30 made using identical first and second sections 301, 302 makes it possible to reduce the costs of obtaining the electronic control unit 15 and to simplify the industrialization of the electromechanical actuator 11.

In a variant, not shown, the first and second sections 301, 302 of the housing 30 have different lengths L301, L302.

Preferably, each of the first and second sections 301, 302 of the housing 30 comprises a first groove 57a and a second groove 57b that are configured to keep the electronic board 29 in position inside the housing 30, in the assembled configuration of the electronic control unit 15.

In this way, during the assembly of the electronic control unit 15 and, in particular, following the assembly of the first and second sections 301, 302 of the housing 30, the electronic board 29 is inserted inside the housing 30 by sliding. The sliding of the electronic board 29 inside the housing 30 is carried out by guiding a printed circuit board 29a of the electronic board 29 inside the first and second grooves 57a, 57b of each of the first and second sections 301, 302 of the housing 30.

The first and second sections 301, 302, which are respectively made in the form of a hollow tube, forming the housing 30 of the electronic control unit 15, thus comprise elements 57a, 57b for positioning and retaining the electronic board 29 that are simple and do not require precise functional dimensioning.

As a result, the cost of obtaining the housing 30 of the electronic control unit 15 is less expensive than a housing of an electronic control unit comprising two half-shells, like that disclosed in document FR2,983,368 A1.

Furthermore, the first and second sections 301, 302 make it possible to produce a spacer by means of the first and second grooves 57a, 57b, so as to electrically insulate the electronic board 29 relative to the casing 17 of the electromechanical actuator 11.

In practice, the first and second grooves 57a, 57b are respectively arranged at an inner surface 58 of each of the first and second sections 301, 302 of the housing 30.

Advantageously, the first groove 57a is diametrically opposite the second groove 57b, for each of the first and second sections 301, 302 of the housing 30.

Preferably, in an assembled configuration of the first and second sections 301, 302 of the housing 30, the first groove 57a of the first section 301 is aligned with the first groove 57a of the second section 302. Furthermore, the second groove 57b of the first section 301 is aligned with the second groove 57b of the second section 302.

In a variant, not shown, the housing 30 of the electronic control unit 15 comprises a single section made in the form of a hollow tube. The section is configured to house the electronic board 29 of the electronic control unit 15, in the assembled configuration of the electromechanical actuator 11.

In such a case, the section of the housing 30 comprises a first end 301a configured to cooperate with the electric motor 16 and, in particular, the cover 16a of the electric motor 16. The section of the housing 30 also comprises a second end 301b, opposite the first end 301a, configured to cooperate with the interface element 31.

Advantageously, the section of the housing 30 comprises first fastening elements 50a configured to cooperate with fastening elements 50b of the electric motor 16, in the assembled configuration of the electromechanical actuator 11. Furthermore, the section of the housing 30 comprises second fastening elements 50c configured to cooperate with fastening elements 50d of the interface element 31, in the assembled configuration of the electromechanical actuator 11.

Thus, the section of the housing 30 is assembled with the electric motor 16 and the interface element 31, in particular before the introduction of these elements 30, 16, 31 and, more specifically, of the assembly 27 inside the casing 17, so as to facilitate the handling and assembly operations of the electromechanical actuator 11.

Preferably, the fastening elements 50a, 50c of the section of the housing 30 and the fastening elements 50b, 50d of the electric motor 16 and of the interface element 31 are fastening elements by resilient snapping.

In a variant, not shown, the housing 30 of the electronic control unit 15 comprises a number of sections, made in the form of a hollow tube, greater than or equal to three.

The electromechanical actuator 11 comprises a first electrical connection device 49. The first electrical connection device 49 is configured to electrically connect the electronic board 29 of the electronic control unit 15 to the electric motor 16, in the assembled configuration of the electromechanical actuator 11.

Here, the first electrical connection device 49 is associated with the electric motor 16, in the assembled configuration of the electromechanical actuator 11.

The first electrical connection device 49 comprises first electrical connection elements 60 configured to electrically connect the electronic board 29 of the electronic control unit 15 to electrical connection elements 63 of the electric motor 16, in the assembled configuration of the electromechanical actuator 11.

Furthermore, the first electrical connection device 49 comprises second electrical connection elements 61 configured to electrically connect the electronic board 29 of the electronic control unit 15 to electrical connection elements 64 of an additional electronic board 65 of the electric motor 16, in the assembled configuration of the electromechanical actuator 11.

The first electrical connection device 49 is configured, on the one hand, to plug onto a first edge of the printed circuit board 29a of the electronic board 29 of the electronic control unit 15 and, on the other hand, to cooperate with electric tracks of the electronic board 29 of the electronic control unit 15, in particular by means of at least the first and second electrical connection elements 60, 61 of the first electrical connection device 49.

Furthermore, the first and second electrical connection elements 60, 61 of the first electrical connection device 49 are electrical connection elements configured to cooperate directly with the respective electrical connection elements 63, 64 of the electric motor 16 and of the additional electronic board 65 of the electric motor 16.

Thus, the first electrical connection device 49 makes it possible to produce an electrical connection from the electronic board 29 of the electronic control unit 15, on the one hand, toward the electric motor 16 and, on the other hand, toward the additional electronic board 65 of the electric motor 16, without using flexible electrical cables.

In this way, such an assembly of the electronic board 29 of the electronic control unit 15 with the electric motor 16 using the first electrical connection device 49 is simplified, while minimizing the costs of obtaining the electromechanical actuator 11 and eliminating manufacturing flaws of the electromechanical actuator 11.

Furthermore, the first electrical connection device 49 facilitates the assembly of the electromechanical actuator 11 and, in particular, of the electronic control unit 15 with the electric motor 16 on an automated production line.

Advantageously, the additional electronic board 65 of the electric motor 16 is positioned inside the cover 16a of the electric motor 16, in particular positioned between a wall of the cover 16a and a body of the electric motor 16, along the direction of the rotation axis X.

Advantageously, the additional electronic board 65 of the electric motor 16 is positioned perpendicular to the electronic board 29 of the electronic control unit 15, in the assembled configuration of the electromechanical actuator 11.

Thus, the additional electronic board 65 of the electric motor 16 extends along a plane B perpendicular to a plane passing through the electronic board 29 of the electronic control unit 15, in the assembled configuration of the electromechanical actuator 11.

Advantageously, the additional electronic board 65 of the electric motor 16 makes it possible to check the position of the rotor of the electric motor 16. Such a determination of the position of the rotor of the electric motor 16 can be carried out either using sensors that can, for example, be two Hall effect sensors positioned on the additional electronic board 65, or using a device for determining a physical property, in particular the electric current passing through the electric motor 16 during its operation.

The number of sensors of the additional electronic board of the electric motor is not limiting and can be different, in particular equal to or greater than or equal to three.

Figure 9:
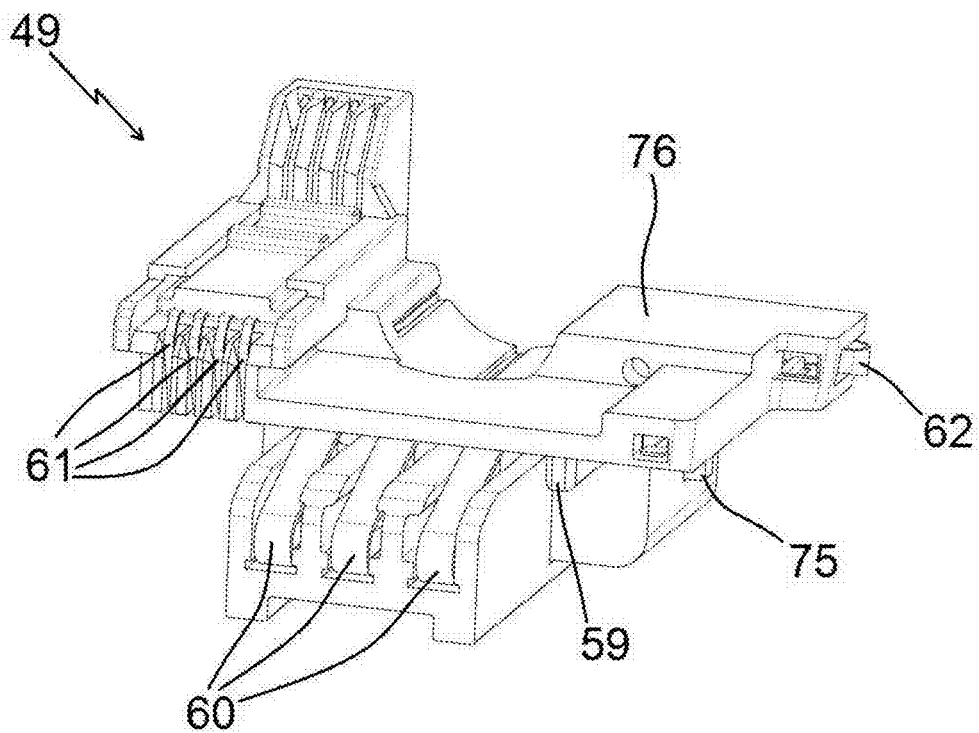
FIG. 9 is a first perspective schematic view of a first electrical connection device of the electromechanical actuator illustrated in FIGS. 4 to 5, 7 and 8.

Advantageously, the first and second electrical connection elements 60, 61 of the first electrical connection device 49, configured to cooperate with the printed circuit board 29a of the electronic board 29 of the electronic control unit 15, are flexible strips, as illustrated in FIG. 9.

Figure 10:
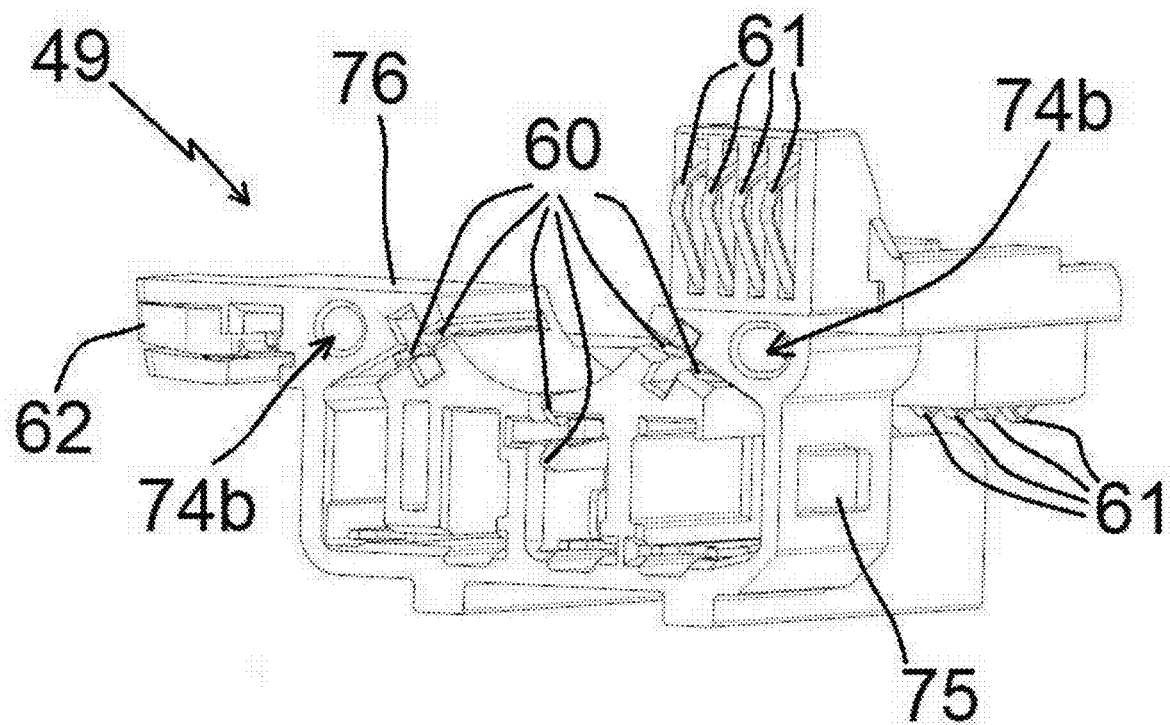
FIG. 10 is a second perspective schematic view, from another angle, of the first electrical connection device of the electromechanical actuator illustrated in FIGS. 4 to 5, 7 and 8.

Advantageously, the first electrical connection elements 60 of the first electrical connection device 49, configured to cooperate with the electrical connection elements 63 of the electric motor 16, are pluggable electrical connection elements, in particular in the form of clamps, as illustrated in FIG. 10.

Furthermore, the second electrical connection elements 61 of the first electrical connection device 49, configured to cooperate with the electrical connection elements 64 of the additional electronic board 65 of the electric motor 16, are flexible strips, as illustrated in FIGS. 9 and 10.

In this exemplary embodiment, there are three first electrical connection elements 60 of the first electrical connection device 49, since the electric motor 16 is of the three-phase type and hard-wired in a triangle.

The number of first electrical connection elements of the first electrical connection device is not limiting and can be different, in particular as a function of the type of electric motor and its electrical wiring.

Furthermore, there are four second electrical connection elements 61 of the first electrical connection device 49, since two of these second electrical connection elements 61 are configured to supply electrical energy to the sensors and another two of these electrical connection elements 61 are configured to transmit signals, from sensors, to the electronic board 29 of the electronic control unit 15.

The number of second electrical connection elements of the first electrical connection device is not limiting and can be different.

Advantageously, the first electrical connection device 49 is positioned, relative to the cover 16a of the electric motor 16, using guiding elements 74a, 74b, as illustrated in FIGS. 8 and 10.

Thus, during the assembly of the electromechanical actuator 11, the first electrical connection device 49 is positioned, relative to the cover 16a of the electric motor 16, using the guiding elements 74a, 74b.

Here, the guiding elements 74a, 74b comprise pins 74a, only one of which is visible in FIG. 8, which are arranged in the cover 16a of the electric motor 16 and holes 74b that are arranged in the housing 76 of the first electrical connection device 49.

Advantageously, the first electrical connection device 49 is kept in position, relative to the cover 16a of the electric motor 16, using fastening elements 75.

Thus, the holding in position of the first electrical connection device 49 relative to the cover 16a of the electric motor 16 makes it possible to limit the wear of the electrical connection elements 60, 61 of the first electrical connection device 49 and the electrical connection elements 63 of the electric motor 16, as well as electrical connection elements 64 of the additional electronic board 65 of the electric motor 16.

In this way, the functional play between the first electrical connection device 49 and the cover 16a of the electric motor 16 is minimized.

Here, the fastening elements 75 of the first electrical connection device 49 relative to the cover 16a of the electric motor 16 are fastening elements by resilient snapping.

Advantageously, the printed circuit board 29a of the electronic board 29 of the electronic control unit 15 comprises a first slit 69. Furthermore, the first electrical connection device 49 comprises a rib 59. The first slit 69 of the printed circuit board 29a is configured to receive the rib 59 of the first electrical connection device 49.

Thus, the first slit 69 of the printed circuit board 29a makes it possible to minimize the lateral functional play of the first electrical connection device 49 relative to the width W29 of the printed circuit board 29a.

In this way, the first and second electrical connection elements 60, 61 of the first electrical connection device 49 are positioned relative to electric tracks of the printed circuit board 29*a*, in the assembled configuration of the electronic control unit 15.

Furthermore, such positioning of the first electrical connection device 49 relative to the printed circuit board 29*a* makes it possible to avoid a shift of the first and second electrical connection elements 60, 61 of the first electrical connection device 49 relative to the electric tracks of the printed circuit board 29*a*, so as to avoid an electrical short-circuit.

Furthermore, such an assembly of the printed circuit board 29*a* and the first electrical connection device 49 makes it possible to eliminate the assembly tolerances of the electronic control unit 15 with the electric motor 16 and, more specifically, with the cover 16*a* of the electric motor 16.

Advantageously, the rib 59 of the first electrical connection device 49 is configured to be inserted into the first slit 69 of the printed circuit board 29*a* with a tight fit.

Preferably, the first electrical connection device 49 also comprises a third electrical connection element 62 configured to electrically connect the electronic board 29 of the electronic control unit 15 to the casing 17 of the electromechanical actuator 11.

Thus, the third electrical connection element 62 is integrated into the first electrical connection device 49, so as to produce an electrical connection between the casing 17 of the electromechanical actuator 11 and the electronic board 29 of the electronic control unit 15.

In this way, the design and the assembly of the electronic control unit 15 and, more generally, of the electromechanical actuator 11 are simplified.

Advantageously, the third electrical connection element 62 of the first electrical connection device 49 is configured to produce an electrical connection between the casing 17 of the electromechanical actuator 11 and the electronic board 29 of the electronic control unit 15, so as to eliminate disturbances at the electronic board 29 of the electronic control unit 15.

Advantageously, the third electrical connection element 62 of the first electrical connection device 49 is configured to produce an electrical connection between the casing 17 of the electromechanical actuator 11 and the electronic board 29 of the electronic control unit 15, so as to discharge electrostatic charges using an electrostatic charge discharging device, not shown.

Thus, the third electrical connection element 62 of the first electrical connection device 49 makes it possible to simplify the compliance with the distance constraints in the air and leakage paths imposed by the safety standards and/or by robustness criteria related to the discharge of electrostatic charges.

Furthermore, the electrostatic charge discharging device makes it possible to discharge electrostatic charges accumulated in the screen 2 of the concealing device 3 of the home automation installation.

In such a case, the electrostatic charge discharging device can be made using a spark gap arranged at the printed circuit board 29*a*.

Advantageously, the spark gap comprises first and second electrodes formed respectively by a first conductive track and by a second conductive track of the printed circuit board 29*a* of the electronic control unit 15. The first electrode is electrically coupled to the casing 17 of the electromechanical actuator 11. Furthermore, the second electrode is electrically coupled to one of the electrical supply conductors supplying electrical energy to the electric motor 16.

Thus, the discharge of electrostatic charges through the spark gap arranged at the printed circuit board 29*a* of the electronic control unit 15 makes it possible to create a preferred discharge path between the casing 17 of the electromechanical actuator 11 and one of the electrical supply conductors supplying electrical energy for the electric motor 16 of the electromechanical actuator 11.

In this way, the discharge of electrostatic charges through the spark gap arranged at the printed circuit board 29*a* makes it possible to avoid malfunctions and/or damage of the electromechanical actuator 11 and, in particular, to prevent the destruction of electronic components mounted on the printed circuit board 29*a*.

In this way, the spark gap arranged at the printed circuit board 29*a* makes it possible to protect the electronic control unit 15 of the electromechanical actuator 11.

Advantageously, the electrical power cable 18 of the electromechanical actuator 11 comprises a plurality of electrical conductors. The electrical supply conductors supplying electrical energy to the electric motor 16 are electrically coupled to the electrical conductors of the electrical power cable 18.

The electrical supply conductors supplying electrical energy to the electric motor 16 are made using electric tracks of the printed circuit board 29*a* electrically coupling the latter to the electrical power cable 18.

In practice, the electrical conductors of the electrical power cable 18 are electrically coupled to the electrical conductors of an electrical energy supply grid of the sector.

Here, the electrical energy supply grid of the sector, the electrical power cable 18 of the electromechanical actuator 11 and the electrical conductors comprise at least one electrical neutral conductor and at least one phase conductor.

In such a case, the electromechanical actuator 11 is supplied with electricity by the electricity grid of the sector, in particular by the commercial AC grid.

The voltage of the electric grid or sector voltage has, for example, a value of 230 VRMS (peak value of 325 V) for the French electric grid and a frequency of 50 Hz.

The sector voltage may have different values, depending on the electric grid of the country in which one is located.

Advantageously, the casing 17 of the electromechanical actuator 11 is electrically coupled to a reference ground, in particular the 0 volts of the printed circuit board 29*a* of the electronic control unit 15.

Advantageously, in such a case, the casing 17 is made from an electrically conductive material, in particular metallic.

Preferably, the third electrical connection element 62 is positioned at one end of the first electrical connection device 49.

Thus, such positioning of the third electrical connection element 62 relative to the first electrical connection device 49 makes it possible to simplify the shape of the housing 30 of the electronic control unit 15.

The first electrical connection device 49 comprises all of the electrical connection elements 60, 61, 62 configured to cooperate with the electric motor 16, the additional electronic board 65 of the electric motor and, optionally, with the casing 17 of the electromechanical actuator 11.

In reference to FIG. 7, the first electrical connection device 49 comprises a first housing 76 and a second housing 77. The second housing 77 is configured to be assembled on the first housing 76. The first housing 76 includes at least the first electrical connection elements 60. Furthermore, the second housing 77 includes at least the second electrical connection elements 61.

Here, the first housing 76 also includes the third electrical connection elements 62.

Thus, the assembly of the electronic control unit 15 with the electric motor 16 using fastening elements 50*a*, 50*b* and the assembly of the second housing 77 on the first housing 76 of the first electrical connection device 49 makes it possible to form an electrical connection of the electronic board 29 of the electronic control unit 15 toward the additional electronic board 65 of the electric motor 16 using the first electrical connection device 49 without flexible electric cables.

In this way, this electrical connection is implemented only using the first electrical connection device 49 plugged onto an edge of the printed circuit board 29*a* of the electronic board 29 and electrically coupled to the additional electronic board 65 of the electric motor 16.

In this exemplary embodiment, the second housing 77 is configured to be fastened on the first housing 76 of the first electrical connection device 49 using fastening elements, in an assembled configuration of the first electrical connection device 49.

Here, the fastening elements of the second housing 77 with the first housing 76 of the first electrical connection device 49 are pluggable fastening elements, in particular a rib configured to slide inside a groove.

In reference to FIGS. 8 to 10, the first electrical connection device 49 comprises a single housing 76. Furthermore, the housing 76 includes at least the first and second electrical connection elements 60, 61.

Here, the housing 76 also includes the third electrical connection elements 62.

Advantageously, the electromechanical actuator 11 comprises a second electrical connection device 48 configured to electrically connect the electronic board 29 of the electronic control unit 15 to the electrical power cable 18, in the assembled configuration of the electromechanical actuator 11.

Here, the second electrical connection device 48 is associated with the interface element 31.

In this exemplary embodiment, the electrical power cable 18 extends partially through the closure element 21.

Advantageously, the interface element 31 configured to cooperate, on the one hand, with the second electrical connection device 48 and, on the other hand, with the electrical power cable 18

The second electrical connection device 48 comprises electrical connection elements 66 configured to electrically connect the electronic board 29 of the electronic control unit 15 to electrical connection elements 67 of the electrical power cable 18, in the assembled configuration of the electromechanical actuator 11.

Advantageously, the second electrical connection device 48 is configured, on the one hand, to plug onto a second edge of the printed circuit board 29*a* of the electronic board 29 of the electronic control unit 15 and, on the other hand, to cooperate with electric tracks of this electronic board 29, in particular by means of at least the electrical connection elements 66 of the second electrical connection device 48.

Furthermore, the electrical connection elements 66 of the second electrical connection device 48 are electrical connection elements configured to cooperate directly with the electrical connection elements 67 of the electrical power cable 18.

Thus, the second electrical connection device 48 makes it possible to produce an electrical connection from the electronic board 29 of the electronic control unit 15 toward the electrical power cable 18, without using flexible electrical cables.

In this way, such an assembly of the electronic board 29 of the electronic control unit 15 with the electrical power cable 18 using the second electrical connection device 48 is simplified, while minimizing the costs of obtaining the electromechanical actuator 11 and eliminating manufacturing flaws of the electromechanical actuator 11.

Furthermore, the second electrical connection device 48 facilitates the assembly of the electromechanical actuator 11 on an automated production line.

Here, the first edge of the printed circuit board 29*a* of the electronic board 29 of the electronic control unit 15 configured to cooperate with the first electrical connection device 49 is different from the second edge of the printed circuit board 29*a* of the electronic board 29 of the electronic control unit 15 configured to cooperate with the second electrical connection device 48.

In this exemplary embodiment, the first edge of the printed circuit board 29*a* is opposite the second edge of the printed circuit board 29*a*.

In a variant, not shown, the first edge of the printed circuit board 29*a* is the same as the second edge of the printed circuit board 29*a*.

Figure 11:
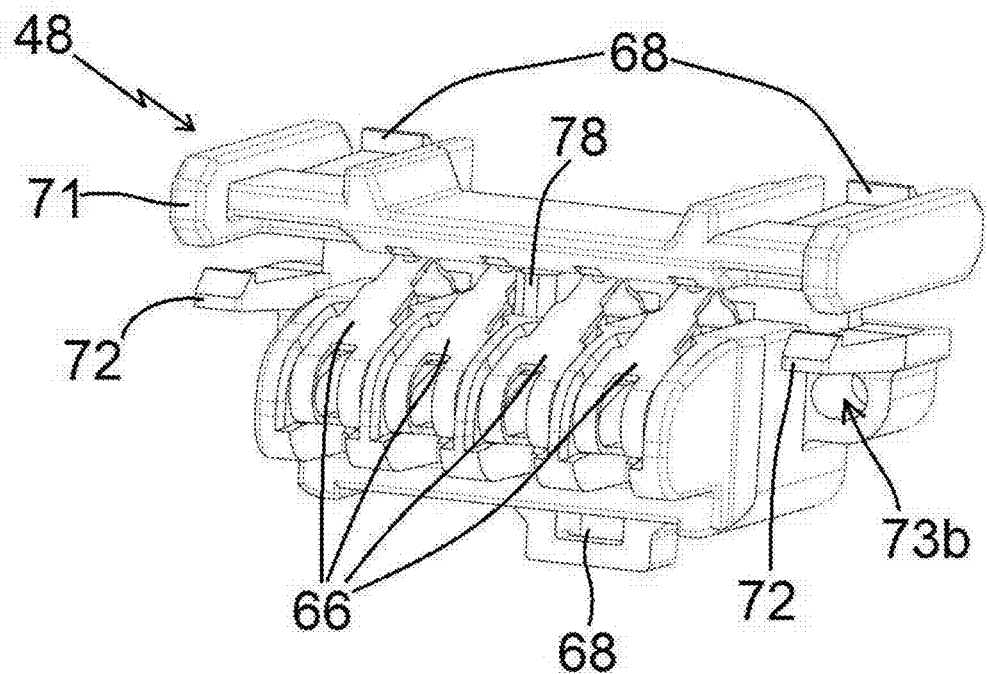
FIG. 11 is a first perspective schematic view of a second electrical connection device of the electromechanical actuator illustrated in FIGS. 4 to 5, 7 and 8.

Here, the electrical connection elements 66 of the second electrical connection device 48, configured to cooperate with the printed circuit board 29*a* of the electronic board 29 of the electronic control unit 15, are flexible strips, as illustrated in FIG. 11.

Figure 12:
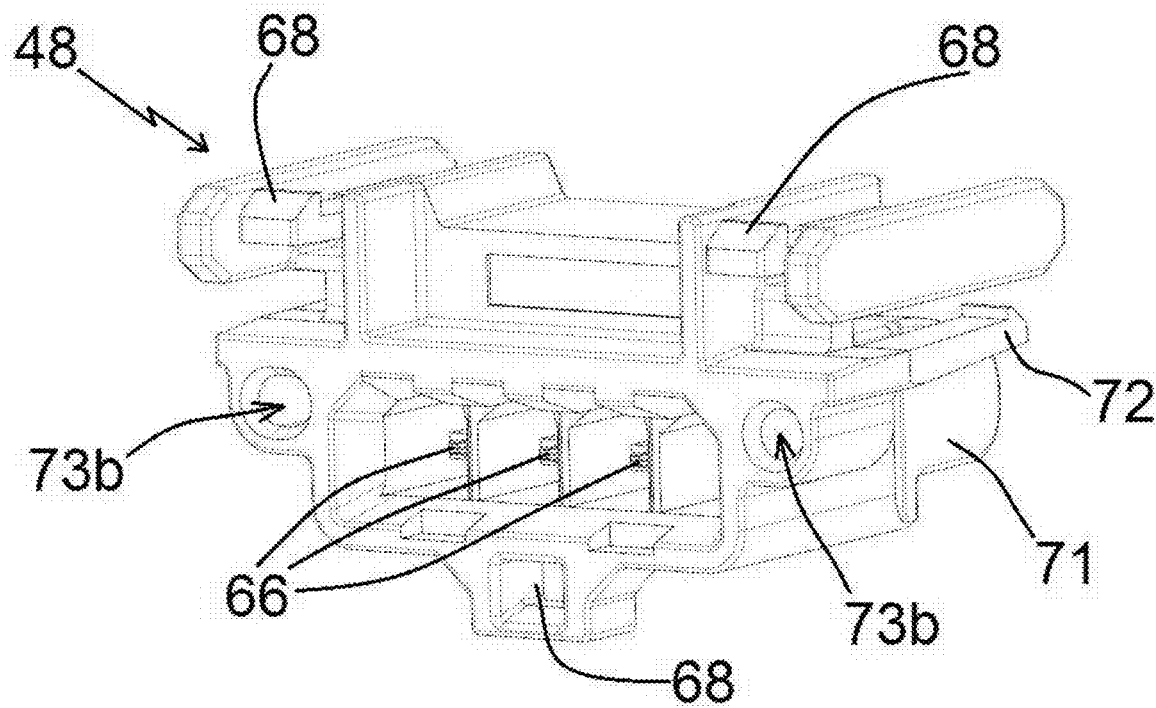
FIG. 12 is a second perspective schematic view, from another angle, of the second electrical connection device of the electromechanical actuator illustrated in FIGS. 4 to 5, 7 and 8.

Furthermore, the electrical connection elements 66 of the second electrical connection device 48 configured to cooperate with the electrical connection elements 67 of the electrical power cable 18 are pluggable electrical connection elements, as illustrated in FIGS. 8 and 12.

Advantageously, the second electrical connection device 48 is positioned relative to the interface element 31 using guiding elements 73*a*, 73*b*, as illustrated in FIGS. 7, 11 and 12.

Thus, during the assembly of the electromechanical actuator 11, the second electrical connection device 48 is positioned relative to the interface element 31 using the guiding elements 73*a*, 73*b*.

Here, the guiding elements 73*a*, 73*b* comprise pins 73*a* arranged in the interface element 31 and holes 73*b* arranged in the housing 71 of the second electrical connection device 48.

Advantageously, the second electrical connection device 48 is kept in position relative to the interface element 31 using fastening elements 68, as illustrated in FIGS. 7, 11 and 12.

Thus, the holding in position of the second electrical connection device 48 relative to the interface element 31 makes it possible to limit the wear of the electrical connection elements 66 of the second electrical connection device 48 and the electrical connection elements 67 of the electrical power cable 18.

In this way, the functional play between the second electrical connection device 48 and the interface element 31 is minimized.

Here, the fastening elements 68 of the second electrical connection device 48 relative to the interface element 31 are fastening elements by resilient snapping.

Advantageously, the second electrical connection device 48 is kept in position relative to the printed circuit board 29*a* of the electronic board 29 of the electronic control unit 15 using fastening elements 72, as illustrated in FIGS. 7, 11 and 12.

Thus, the holding in position of the second electrical connection device 48 relative to the printed circuit board 29a makes it possible to limit the wear of the electrical connection elements 66 of the second electrical connection device 48 and the electric tracks of the electronic board 29.

In this way, the functional play between the second electrical connection device 48 and the printed circuit board 29a is minimized.

Here, the fastening elements 72 of the second electrical connection device 48 relative to the printed circuit board 29a are fastening elements by resilient snapping.

Advantageously, the printed circuit board 29a of the electronic board 29 of the electronic control unit 15 comprises a second slit 70. Furthermore, the second electrical connection device 48 comprises a rib 78. The second slit 70 of the printed circuit board 29a is configured to receive the rib 78 of the second electrical connection device 48.

Thus, the second slit 70 of the printed circuit board 29a of the electronic board 29 of the electronic control unit 15 makes it possible to minimize the lateral functional play of the second electrical connection device 48 relative to the width W29 of the printed circuit board 29a.

In this way, the electrical connection elements 66 of the second electrical connection device 48 are positioned relative to electric tracks of the printed circuit board 29a, in the assembled configuration of the electronic control unit 15.

Furthermore, such positioning of the second electrical connection device 48 relative to the printed circuit board 29a makes it possible to avoid a shift of the electrical connection elements 66 of the second electrical connection device 48 relative to the electric tracks of the printed circuit board 29a, so as to avoid an electrical short-circuit.

Furthermore, such an assembly of the printed circuit board 29a and the second electrical connection device 48 makes it possible to eliminate the assembly tolerances of the electronic control unit 15 with the interface element 31.

Advantageously, the rib 78 of the second electrical connection device 48 is configured to be inserted into the second slit 70 of the printed circuit board 29a with a tight fit.

Here, the second electrical connection device 48 comprises a single housing 71. Furthermore, the housing 71 includes at least the electrical connection elements 66.

Advantageously, the assembly of the electronic control unit 15 with the electric motor 16 and the interface element 31 using fastening elements 50a, 50b, 50c, 50d and the assembly of the first and second electrical connection devices 48, 49 on the printed circuit board 29a of the electronic board 29 make it possible to form an electrical connection of the electronic board 29 toward the electric motor 16 using the first electrical connection device 49 and to form an electrical connection of the electronic board 29 toward the interface element 31 using the second electrical connection device 48, without using flexible electrical cables.

In this way, these electrical connections are implemented only using first and second electrical connection devices 48, 49 respectively plugged onto an edge of the printed circuit board 29a of the electronic board 29 of the electronic control unit 15.

The positioning and holding in position of the first and second electrical connection devices 48, 49 respectively on one edge of the printed circuit board 29a make it possible to simplify the assembly of the electronic control unit 15.

Furthermore, the electrical power cable 18, the electronic board 29 of the electronic control unit 15, the electric motor 16 and the additional electronic board 65 of the electric motor 16 are electrically coupled using the first and second electrical connection devices 48, 49, without using flexible electrical cables.

In this way, the process of assembling the electromechanical actuator 11 is simplified and the respect for compliance with the normative constraints is made easier.

Furthermore, such an assembly of the electronic control unit 15 with the electrical power cable 18 and the electric motor 16 using the first and second electrical connection devices 48, 49 facilitates the automation of the assembly of the electromechanical actuator 11.

The various members of the electromechanical actuator 16 belonging to the home automation installation of FIGS. 1 and 2 are now described in reference to FIGS. 3 to 11.

Advantageously, the electric motor 16 has a body 16c, as illustrated in FIG. 16. Furthermore, the body 16c of the electric motor 16 is, preferably, in cylindrical shape and, more specifically, has a circular section.

Preferably, the outer diameter of the body 16c of the electric motor 16 is smaller than the inner diameter of the casing 17 of the electromechanical actuator 11, such that the body 16c of the electric motor 16 can be inserted into the casing 17 of the electromechanical actuator 11, during the assembly of the electromechanical actuator 11.

Advantageously, the reduction gear 19 has a body 19c, as illustrated in FIG. 16. Furthermore, the body 19c of the reduction gear 19 is, preferably, in cylindrical shape and, more specifically, has a circular section.

Preferably, the outer diameter of the body 19c of the reduction gear 19 is smaller than the inner diameter of the casing 17 of the electromechanical actuator 11, such that the body 19c of the reduction gear 19 can be inserted into the casing 17 of the electromechanical actuator 11, during the assembly of the electromechanical actuator 11.

Figure 6:
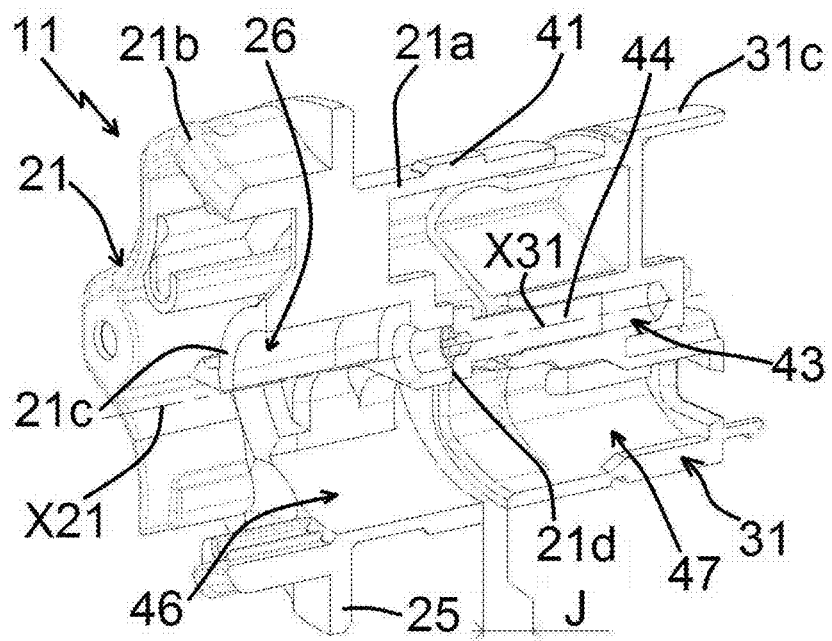
FIG. 6 is a sectional and perspective schematic view of part of the electromechanical actuator illustrated in FIGS. 4 and 5, showing a closure element, an interface element and an inhibiting element.

Advantageously, the interface element 31 has a body 31c, as illustrated in FIGS. 6 and 16. Furthermore, the body 31c of the interface element 31 is, preferably, in cylindrical shape and, more specifically, has a circular section.

Preferably, the outer diameter of the body 31c of the interface element 31 is smaller than the inner diameter of the casing 17 of the electromechanical actuator 11, such that the body 31c of the interface element 31 can be inserted into the casing 17 of the electromechanical actuator 11, during the assembly of the electromechanical actuator 11.

Advantageously, the brake 24 has a body 24c, as illustrated in FIG. 16. Furthermore, the body 24c of the brake 24 is, preferably, in cylindrical shape and, more specifically, has a circular section.

Preferably, the outer diameter of the body 24c of the brake 24 is smaller than the inner diameter of the casing 17 of the electromechanical actuator 11, such that the body 24c of the brake 24 can be inserted into the casing 17 of the electromechanical actuator 11, during the assembly of the electromechanical actuator 11.

Advantageously, the body 31c of the interface element 31, the first and second sections 301, 302 of the housing 30 of the electronic control unit 15, the body 16c of the electric motor 16, the body 19c of the reduction gear 19 and, optionally, the body 24c of the brake 24 are assembled to one another using fastening elements 50a, 50b, 50c, 50d, 51a, 51b, in particular by resilient snapping, so as to form the assembly 27.

Thus, the fastening elements 50a, 50b, 50c, 50d, 51a, 51b of the various members 31, 15, 16, 19, 24 of the assembly 27 make it possible to secure these members 31, 15, 16, 19, 24 to one another in rotation and in translation.

In this way, following the fastening of the members 31, 15, 16, 19, 24 of the assembly 27 relative to one another, the links between the members 31, 15, 16, 19, 24 of the assembly 27 have no axial travel, outside the assembly tolerances of the members 31, 15, 16, 19, 24 relative to one another.

Furthermore, the assembly of the various members 31, 15, 16, 19, 24 of the assembly 27 using fastening elements 50a, 50b, 50c, 50d, 51a, 51b makes it possible to introduce, in a single operation, the assembly 27 into the casing 17, following a translational movement.

Here, the fastening elements 50a, 50b, 50c, 50d, 51a, 51b by resilient snapping are made using tongues and slugs.

Here, one of the members of the assembly 27 is assembled to another of the members of the assembly 27 using fastening elements 50a, 50b, 50c, 50d, 51a, 51b by resilient snapping, of which there may be four that are angularly offset by an angle of 90° about the axis of rotation X.

The number and the angular position of the fastening elements by resilient snapping between two of the members of the assembly are not limiting and can be different, in particular, these fastening elements can be three in number and angularly offset by an angle of 120° about the axis of rotation.

Preferably, the outer diameter, respectively, of the body 31c of the interface element 31, the housing 30 of the electronic control unit 15, the body 16c of the electric motor 16, the body 19c of the reduction gear 19 and the body 24c of the brake 24 have a same value.

Advantageously, the electromechanical actuator 11 also comprises a retaining element 32. The retaining element 32 is assembled at the first end 17a of the casing 17. The retaining element 32 comprises a first stop 33 configured to cooperate with the assembly 27 and, more specifically, with the reduction gear 19, in the assembled configuration of the electromechanical actuator 11.

Figure 14:
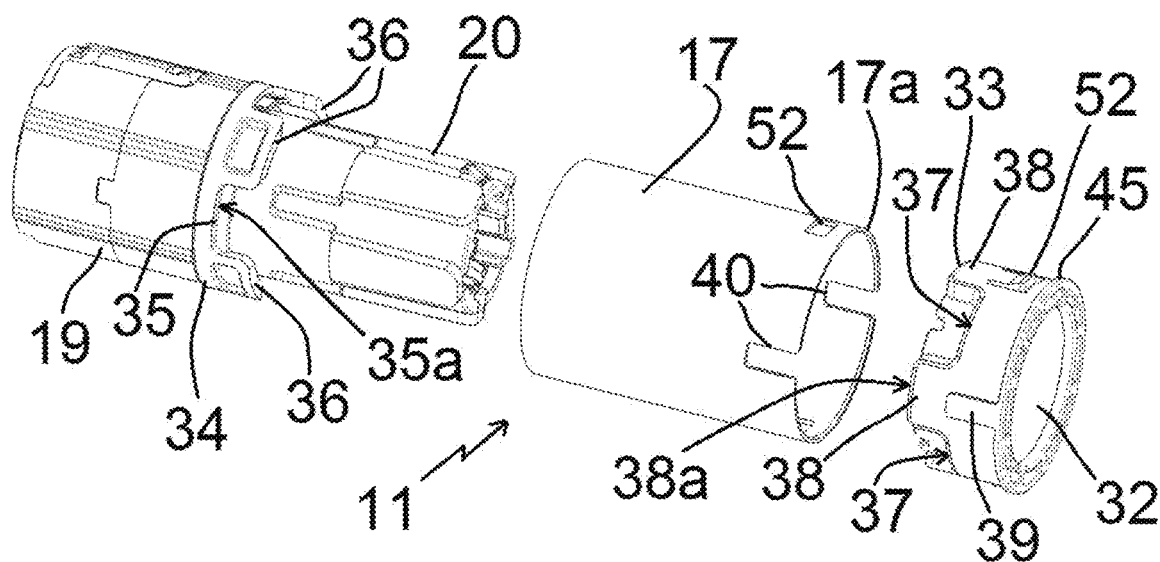
FIG. 14 is an exploded and perspective schematic view of part of the actuator illustrated in FIGS. 4 and 5, showing part of a casing of the electromechanical actuator, a reduction gear, an output shaft, an endpiece and a retaining element.
Figure 15:
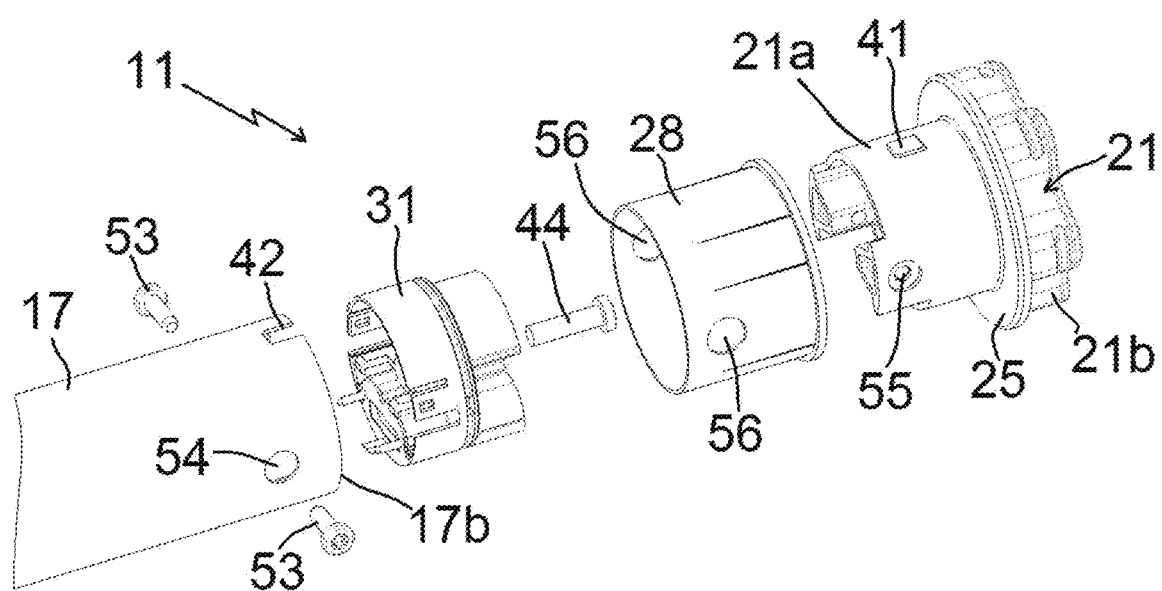
FIG. 15 is an exploded and perspective schematic view of part of the electromechanical actuator illustrated in FIGS. 4 and 5, showing part of the casing of the electromechanical actuator, a crown, the closure element, the interface element and the inhibiting element.

In the exemplary embodiment illustrated in FIGS. 4, 5, 14 and 16, the assembly 27 and, more specifically, the reduction gear 19 comprises an endpiece 34 configured to cooperate with the retaining element 32, at the first end 17a of the casing 17, in the assembled configuration of the electromechanical actuator 11. In FIG. 14, only part of the casing 17 is shown, near its end 17a.

Here, the endpiece 34 comprises notches 35 and tongues 36, positioned alternating around the axis of rotation X, configured to cooperate, respectively, with tongues 38 and notches 37 of the retaining element 32.

Thus, the tongues 38 of the retaining element 32 are configured to engage in the notches 35 of the endpiece 34, in the assembled configuration of the electromechanical actuator 11. Furthermore, the tongues 36 of the endpiece 34 are configured to engage in the notches 37 of the retaining element 32, in the assembled configuration of the electromechanical actuator 11.

In such a case, the first stop 33 of the retaining element 32 configured to cooperate with the assembly 27 and, more specifically, with the reduction gear 19, in the assembled configuration of the electromechanical actuator 11, is produced by an end wall 38a of each of the tongues 38, these end walls 38a bearing against the bottom walls 35a of each of the notches 35 of the endpiece 34.

Here, the endpiece 34 comprises four notches 35 that are angularly offset by an angle of 90°, around the axis of rotation X, and four tongues 36 that are angularly offset by an angle of 90°, around the axis of rotation X. Furthermore, the retaining element 32 comprises four notches 37 that are angularly offset by an angle of 90°, around the axis of rotation X, and four tongues 38 that are angularly offset by an angle of 90°, around the axis of rotation X.

The number and the angular position of the notches and tongues of the endpiece and of the retaining element are not limiting and can be different, in particular, these notches and tongues can be three in number and angularly offset by an angle of 120° about the axis of rotation.

Furthermore, the retaining element 32 comprises indentations 39, each in the form of a radial protrusion, configured to cooperate with first recesses 40 of the casing 17. The first recesses 40 are arranged at the first end 17a of the casing 17.

Here, the retaining element 32 comprises two diametrically opposite indentations 39 relative to the axis of rotation X. Furthermore, the casing 17 comprises two first recesses 40 that are diametrically opposite relative to the axis of rotation X.

In this way, such an assembly of the endpiece 34, the retaining element 32 and the casing 17 makes it possible to block the rotation of the assembly 27 relative to the casing 17 and, more specifically, the reduction gear 19 relative to the casing 17.

Advantageously, the retaining element 32 comprises a second stop 45 configured to cooperate with the casing 17, at the first end 17a of the casing 17, in the assembled configuration of the electromechanical actuator 11.

Thus, the second stop 45 of the retaining element 32 makes it possible to limit the pushing in of the retaining element 32 in the casing 17.

Here, the second stop 45 of the retaining element 32 is made in the form of a flange ring, in particular with a cylindrical and planar shape, perpendicular to the axis of rotation X, in the assembled configuration of the electromechanical actuator 11.

Furthermore, the retaining element 32 and the casing 17 are also assembled to one another using fastening elements 52, in particular by resilient snapping.

Thus, the assembly of the retaining element 32 with the casing 17 makes it possible to block the translation of the retaining element 32 and, more specifically, the assembly 27 relative to the casing 17 and, more specifically, relative to the first end 17a of the casing 17.

In this way, following the fastening of the retaining element 32 with respect to the casing 17, the retaining element 32 serves as a stop for the assembly 27, during the sliding of the assembly 27 inside the casing 17, along the axial direction of the electromechanical actuator 11, from the second end 17b of the casing 17 toward the first end 17a of the casing 17.

Furthermore, the closure element 21 and, more specifically, the first part 21a of the closure element 21 comprises indentations 41, each in the form of a radial protrusion, configured to cooperate with second recesses 42 of the casing 17. The second recesses 42 are arranged at the second end 17b of the casing 17.

Here, the first part 21a of the closure element 21 comprises two diametrically opposite indentations 41 relative to the axis of rotation X. Furthermore, the casing 17 comprises two second recesses 42 that are diametrically opposite relative to the axis of rotation X.

In this way, such an assembly of the closure element 21 and the casing 17 makes it possible to block the rotation of the closure element 21 relative to the casing 17.

Furthermore, the closure element 21 and the casing 17 are also assembled to one another using fastening elements 53, in particular by screwing.

In this way, the assembly of the closure element 21 with the casing 17 makes it possible to block the translation of the closure element 21 relative to the casing 17 and, more specifically, relative to the second end 17b of the casing 17.

Here, the fastening of the closure element 21 with the casing 17 is carried out using fastening screws 53, which may, for example, be of the self-tapping type. In the assembled configuration of the electromechanical actuator 11, the fastening screws 53 pass through passage holes 54 arranged in the casing 17 and are screwed in fastening holes 55 of the closure element 21. Furthermore, the fastening screws 53 pass through passage holes 56 arranged in the crown 28.

In a variant, not shown, the fastening elements of the closure element 21 with the casing 17 can be rivets or fastening elements by resilient snapping.

Such an assembly of the electromechanical actuator 11 makes it possible to provide play J, in particular axial, between the closure element 21 and the interface element 31, along the axial direction of the electromechanical actuator 11, as illustrated in FIGS. 5 and 6.

The play J makes it possible to guarantee the assembly of the closure element 21 relative to the casing 17.

Here and non-limitingly, the play J between the closure element 21 and the interface element 31, along the axial direction of the electromechanical actuator 11, can be of the order of plus or minus two millimeters.

Advantageously, the interface element 31 comprises a first accommodation 43 inside which an inhibiting element 44 is positioned inhibiting the play J between the closure element 21 and the interface element 31, along the axial direction of the electromechanical actuator 11.

Thus, the inhibiting element 44 of the play J between the closure element 21 and the interface element 31, along the axial direction of the electromechanical actuator 11, makes it possible to improve the holding of the members 31, 15, 16, 19, 24, 20 of the electromechanical actuator 11 that are positioned inside the casing 17 and to eliminate the risk of electrical disconnection of the electronic control unit 15 with respect to the electrical power cable 18 and with respect to the electric motor 16, in particular upon impact of the electromechanical actuator 11, which may occur during a handling or the transport of the electromechanical actuator 11, or during abnormal operation of the electromechanical actuator 11.

In this way, such a construction of the electromechanical actuator 11 makes it possible to inhibit the play J between the closure element 21 and the interface element 31, along the axial direction of the electromechanical actuator 11, following the assembly of the electromechanical actuator 11, so as to guarantee a functional state of the electromechanical actuator 11, during different phases in the lifetime of the electromechanical actuator 11.

Furthermore, the inhibiting element 44 makes it possible to block the translation of the interface element 31 relative to the closure element 21.

Here, the first accommodation 43 of the interface element 31 has a generally cylindrical shape, centered on a longitudinal axis X31 of the interface element 31.

Furthermore, the longitudinal axis X31 of the interface element 31 is combined with the rotation axis X of the electric motor 16 of the electromechanical actuator 11, or the rotation axis of the winding tube 4, in the mounted configuration of the motorized driving device 5.

Preferably, the closure element 21 comprises a first accommodation 26 emerging at a first face 21c of the closure element 21 and at a second face 21d of the closure element 21.

The first accommodation 26 of the closure element 21 is positioned opposite the inhibiting element 44, in the assembled configuration of the electromechanical actuator 11, so as to allow a position adjustment of the inhibiting element 44 from the outside of the closure element 21.

Thus, the position adjustment of the inhibiting element 44 with respect to the interface element 31 and the closure element 21, along the axial direction of the electromechanical actuator 11, can be carried out from the outside of the closure element 21 and, more specifically, of the electromechanical actuator 11, by maneuvering the inhibiting element 44 using a tool, not shown, such as a screwdriver, that passes through the first accommodation 26 of the closure element 21, as explained hereinafter.

In this way, the positioning of the inhibiting element 44 relative to the interface element 31 and the closure element 21, along the axial direction of the electromechanical actuator 11, can be carried out as a function of the value of the play J, without having to disassemble one or several elements of the electromechanical actuator 11.

Here, the first accommodation 26 of the closure element 21 has a generally cylindrical shape, centered on a longitudinal axis X21 of the closure element 21.

Furthermore, the longitudinal axis X21 of the closure element 21 is combined with the rotation axis X of the electric motor 16 of the electromechanical actuator 11, or the rotation axis of the winding tube 4, in the mounted configuration of the motorized driving device 5. Furthermore, the longitudinal axis X21 of the closure element 21 is combined with the longitudinal axis X31 of the interface element 31, in the assembled configuration of the electromechanical actuator 11.

Advantageously, the inhibiting element 44 is configured to cooperate with a face of the closure element 21 and, more specifically, the second face 21d of the closure element 21, following a position adjustment of the inhibiting element 44 relative to the closure element 21, along the axial direction of the electromechanical actuator 11, so as to inhibit the play J between the closure element 21 and the interface element 31.

Thus, the inhibition of the play J between the closure element 21 and the interface element 31 is implemented by the position adjustment of the inhibiting element 44 relative to the interface element 31 and the closure element 21, along the axial direction of the electromechanical actuator 11 and, more specifically, the bearing of the inhibiting element 44 against the second face 21d of the closure element 21.

Preferably, the inhibiting element 44 is a screw. Furthermore, the first accommodation 43 of the interface element 31 is a bore.

Here, the inhibiting element 44 is a screw having a metric thread. Furthermore, the first accommodation 43 of the interface element 31 is a tapped bore.

In a variant, not shown, the inhibiting element 44 is a self-tapping screw. In this case, the first accommodation 43 of the interface element 31 is a smooth bore.

In one exemplary embodiment, the screw forming the inhibiting element 44 is a screw identical to the screws forming the fastening elements 53 of the closure element 21 with the casing 17.

Thus, the number of screw models for manufacturing the electromechanical actuator 11 is limited, so as to simplify industrialization and avoid reference error risks.

In practice, a head of the screw forming the inhibiting element 44 is configured to cooperate with the second face 21*d* of the closure element 21, following unscrewing of the screw 44 relative to the bore 43 of the interface element 31, so as to inhibit the play J between the closure element 21 and the interface element 31.

Advantageously, the first accommodation 26 arranged in the closure element 21 allows the passage of a tool, in particular a screwdriver, so as to reach the inhibiting element 44 and, more specifically, to allow the unscrewing of the screw forming the inhibiting element 44.

Preferably, the inhibiting element 44 is assembled on the interface element 31 before the assembly 27 is introduced inside the casing 17.

Thus, the operation to assemble the inhibiting element 44 on the interface element 31 does not cause an extension of the time to assemble the assembly 27 inside the casing 17, since this operation can be carried out during hidden time, during the manufacturing of the electromechanical actuator 11.

Here, the screw 44 is screwed to the inside of the first accommodation 43 of the interface element 31 before the assembly 27 is introduced inside the casing 17, in particular until the head of the screw 44 is made to bear against the rim of the first accommodation 43 of the interface element 31.

Advantageously, the closure element 21 comprises a second accommodation 46. The second accommodation 46 of the closure element 21 is configured to allow the passage of the electrical power cable 18.

Furthermore, the interface element 31 comprises a second accommodation 47. The second accommodation 47 of the interface element 31 comprises part of the second electrical connection device 48. The second electrical connection device 48 arranged in the second accommodation 47 of the interface element 31 is configured to cooperate with the electrical connection elements 67 of the electrical power cable 18.

Furthermore, the second electrical connection device 48 is electrically coupled to the electronic control unit 15, using electrical connection elements 66 configured to cooperate with tracks of the electronic board 29 of the electronic control unit 15.

Thus, the electrical connection elements 67 of the electrical power cable 18 are configured to cooperate with the electrical connection elements 66 of the second electrical connection device 48, so as to supply electrical energy to the electric motor 16, using the electrical power cable 18.

In one exemplary embodiment, not shown, the second accommodation 46 of the closure element 21 is also configured to allow the passage of a data exchange cable.

In this case, the interface element 31 comprises a third accommodation. The third accommodation of the interface element 31 comprises an electrical connector. This electrical connector arranged in the third accommodation of the interface element 31 is configured to cooperate with an electrical connector of the data exchange cable.

Furthermore, still in this case, this electrical connector of the interface element 31 is electrically coupled to the electronic control unit 15, using electrical connection elements, in particular using electrical pins, not shown, configured to cooperate with tracks of the electronic board 29 of the electronic control unit 15.

In such a case where the electromechanical actuator 11 is coupled to the data exchange cable, the latter allows the electronic control unit 15 to receive and/or send data with a control unit, in particular with the local control unit 12 and/or the central control unit 13, via a wired link.

Thus, the electrical connector of the data exchange cable is configured to cooperate with this electrical connector of the interface element 31, so as to exchange data between at least one of the control units 12, 13 and the electronic control unit 15.

Owing to the present invention, the first electrical connection device makes it possible to produce an electrical connection from the electronic board of the electronic control unit, on the one hand, toward the electric motor and, on the other hand, toward the additional electronic board of the electric motor, without using flexible electrical cables.

In this way, such an assembly of the electronic board of the electronic control unit with the electric motor using the first electrical connection device is simplified, while minimizing the costs of obtaining the electromechanical actuator and eliminating manufacturing flaws of the electromechanical actuator.

Many changes can be made to the example embodiment previously described without going beyond the scope of the invention.

In a variant, not shown, the second electrical connection device 48 comprises the third electrical connection element 62 configured to electrically connect the electronic board 29 of the electronic control unit 15 to the casing 17 of the electromechanical actuator 11.

In a variant, not shown, the cover 16*a* of the electric motor 16 comprises the third electrical connection element 62 configured to electrically connect the electronic board 29 of the electronic control unit 15 to the casing 17 of the electromechanical actuator 11.

Furthermore, the considered embodiments and variants may be combined to generate new embodiments of the invention, without going beyond the scope of the invention.

The invention claimed is:

1. A tubular electromechanical actuator for a closure or sun protection home automation installation, the electromechanical actuator comprising at least:
   an electric motor,
   a reduction gear,
   an electronic control unit, the electronic control unit comprising a housing and an electronic board, the electronic board being arranged inside the housing, in an assembled configuration of the electronic control unit,
   a first electrical connection device, the first electrical connection device being configured to electrically connect the electronic board of the electronic control unit to the electric motor, in an assembled configuration of the electromechanical actuator, and
   a casing, the casing being hollow and configured to house at least the electronic control unit, the electric motor and the reduction gear,
   wherein the first electrical connection device comprises at least:
      first electrical connection elements configured to electrically connect the electronic board of the electronic control unit to electrical connection elements of the electric motor, in the assembled configuration of the electromechanical actuator, and
      second electrical connection elements configured to electrically connect the electronic board of the electronic control unit to electrical connection elements of an additional electronic board of the electric motor, in the assembled configuration of the electromechanical actuator,
   wherein the first electrical connection device is configured, on the one hand, to plug onto an edge of a printed circuit board of the electronic board of the electronic control unit and, on the other hand, to cooperate with electric tracks of the electronic board of the electronic control unit, wherein the first and second electrical connection elements of the first electrical connection device are electrical connection elements configured to cooperate directly with the respective electrical connection elements of the electric motor and of the additional electronic board of the electric motor.

2. The tubular electromechanical actuator for a closure or sun protection home automation installation according to claim 1, wherein the first electrical connection device comprises a single housing and in that wherein the housing includes at least the first and second electrical connection elements of the first electrical connection device.

3. The tubular electromechanical actuator for a closure or sun protection home automation installation according to claim 1, wherein:
the first electrical connection device comprises a first housing and a second housing, the second housing being configured to be assembled on the first housing,
the first housing includes at least the first electrical connection elements of the first electrical connection device, and
the second housing includes at least the second electrical connection elements of the first electrical connection device.

4. The tubular electromechanical actuator for a closure or sun protection home automation installation according to claim 1, wherein the first electrical connection device also comprises a third electrical connection element configured to electrically connect the electronic board of the electronic control unit to the casing of the electromechanical actuator.

5. The tubular electromechanical actuator for a closure or sun protection home automation installation according to claim 4, wherein the third electrical connection element of the first electrical connection device is configured to produce an electrical connection between the casing of the electromechanical actuator and the electronic board of the electronic control unit, so as to discharge electrostatic charges using an electrostatic charge discharging device.

6. The tubular electromechanical actuator for a closure or sun protection home automation installation according to claim 4, wherein the casing of the electromechanical actuator is made from an electrically conductive material.

7. The tubular electromechanical actuator for a closure or sun protection home automation installation according to claim 1, wherein the housing of the electronic control unit comprises at least one section made in the form of a hollow tube, the section is configured to house the electronic board of the electronic control unit, in the assembled configuration of the electromechanical actuator.

8. The tubular electromechanical actuator for a closure or sun protection home automation installation according to claim 1, wherein the electromechanical actuator comprises a second electromechanical connection device configured to electrically connect the electronic board of the electronic control unit to an electrical power cable, in the assembled configuration of the electromechanical actuator.

9. The tubular electromechanical actuator for a closure or sun protection home automation installation according to claim 8, wherein the electromechanical actuator also comprises:
a closure element, the closure element being configured to close off an end of the casing,
an interface element, the interface element being arranged between the closure element and the electronic control unit,
and wherein the interface element is configured to cooperate, on the one hand, with the second electrical connection device and, on the other hand, with the electrical power cable.

10. A home automation installation for closing or providing sun protection that comprises a screen able to be wound on a winding tube rotated by a tubular electromechanical actuator, wherein the tubular electromechanical actuator is according to claim 1.

11. The tubular electromechanical actuator for a closure or sun protection home automation installation according to claim 2, wherein the first electrical connection device also comprises a third electrical connection element configured to electrically connect the electronic board of the electronic control unit to the casing of the electromechanical actuator.

12. The tubular electromechanical actuator for a closure or sun protection home automation installation according to claim 3, wherein the first electrical connection device also comprises a third electrical connection element configured to electrically connect the electronic board of the electronic control unit to the casing of the electromechanical actuator.

13. The tubular electromechanical actuator for a closure or sun protection home automation installation according to claim 5, wherein the casing of the electromechanical actuator is made from an electrically conductive material.

14. The tubular electromechanical actuator for a closure or sun protection home automation installation according to claim 2, wherein the housing of the electronic control unit comprises at least one section made in the form of a hollow tube, the section is configured to house the electronic board of the electronic control unit, in the assembled configuration of the electromechanical actuator.

15. The tubular electromechanical actuator for a closure or sun protection home automation installation according to claim 3, wherein the housing of the electronic control unit comprises at least one section made in the form of a hollow tube, the section is configured to house the electronic board of the electronic control unit, in the assembled configuration of the electromechanical actuator.

16. The tubular electromechanical actuator for a closure or sun protection home automation installation according to claim 4, wherein the housing of the electronic control unit comprises at least one section made in the form of a hollow tube, the section is configured to house the electronic board of the electronic control unit, in the assembled configuration of the electromechanical actuator.

17. The tubular electromechanical actuator for a closure or sun protection home automation installation according to claim 5, wherein the housing of the electronic control unit comprises at least one section made in the form of a hollow tube, the section is configured to house the electronic board of the electronic control unit, in the assembled configuration of the electromechanical actuator.

18. The tubular electromechanical actuator for a closure or sun protection home automation installation according to claim 6, wherein the housing of the electronic control unit comprises at least one section made in the form of a hollow tube, the section is configured to house the electronic board of the electronic control unit, in the assembled configuration of the electromechanical actuator.

19. The tubular electromechanical actuator for a closure or sun protection home automation installation according to claim 2, wherein the electromechanical actuator comprises a second electromechanical connection device configured to electrically connect the electronic board of the electronic control unit to an electrical power cable, in the assembled configuration of the electromechanical actuator.

20. The tubular electromechanical actuator for a closure or sun protection home automation installation according to claim 3, wherein the electromechanical actuator comprises a second electromechanical connection device configured to electrically connect the electronic board of the electronic control unit to an electrical power cable, in the assembled configuration of the electromechanical actuator.

* * * * *